US011258881B2

(12) United States Patent
Singh et al.

(10) Patent No.: US 11,258,881 B2
(45) Date of Patent: Feb. 22, 2022

(54) MOBILITY OF USER APPLICATIONS ACROSS CLOUD INFRASTRUCTURES

(71) Applicant: Nutanix, Inc., San Jose, CA (US)

(72) Inventors: Gaurav Kumar Singh, Bareilly (IN); Hitesh Laxmikant Ambarkhane, Bangalore (IN); Niteen Ashokrao Gavhane, Bangalore (IN); Pranav Gupta, Jaipur (IN); Shantanu Shrivastava, Noida (IN)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 16/711,469

(22) Filed: Dec. 12, 2019

(65) Prior Publication Data
US 2021/0014333 A1    Jan. 14, 2021

(30) Foreign Application Priority Data
Jul. 12, 2019  (IN) .............................. 201941028132

(51) Int. Cl.
| | | |
|---|---|---|
| *H04L 29/08* | (2006.01) | |
| *H04L 12/24* | (2006.01) | |
| *H04L 67/75* | (2022.01) | |
| *H04L 41/0806* | (2022.01) | |
| *H04L 67/1097* | (2022.01) | |

(52) U.S. Cl.
CPC .......... *H04L 67/36* (2013.01); *H04L 41/0806* (2013.01); *H04L 67/1097* (2013.01)

(58) Field of Classification Search
CPC ..... H04L 67/34–67/36; H04L 67/10–67/1097; H04L 41/08–41/0886
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,444,896 B2 | 9/2016 | Zheng et al. |
| 9,596,302 B2 | 3/2017 | Salle et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Clayton R Williams
(74) *Attorney, Agent, or Firm* — Iphorizons PLLC; Narendra Reddy Thappeta

(57) ABSTRACT

An aspect of the present disclosure facilitates mobility of user applications across cloud infrastructures. In one embodiment, a mobility server maintains a setup data which indicates that a user application is to be operative based on a specific set of application components when the user application is to be hosted on a cloud infrastructure. Upon receiving a request to move the user application currently executing in a source cloud infrastructure to the cloud infrastructure, mobility server provisions the specific set of application components in the cloud infrastructure in view of the setup data and then executes the user application in the cloud infrastructure based on the specific set of application components.

20 Claims, 11 Drawing Sheets

(56) References Cited

U.S. PATENT DOCUMENTS

| | | | |
|---|---|---|---|
| 9,645,858 B2 | 5/2017 | Winterfeldt et al. | |
| 9,753,669 B2 | 9/2017 | Ben-Shaul et al. | |
| 9,772,866 B1 | 9/2017 | Aron et al. | |
| 9,942,323 B2 | 4/2018 | Vasetsky et al. | |
| 10,175,967 B2 | 1/2019 | Kapoor et al. | |
| 10,284,557 B1 | 5/2019 | Nossik et al. | |
| 10,609,143 B1 | 3/2020 | Nossik et al. | |
| 10,944,630 B2 | 3/2021 | Patil et al. | |
| 11,063,745 B1 | 7/2021 | Du et al. | |
| 2012/0151061 A1* | 6/2012 | Bartfai-Walcott | G06F 9/4856 709/226 |
| 2013/0007216 A1* | 1/2013 | Fries | G06F 9/4856 709/218 |
| 2013/0198384 A1* | 8/2013 | Kirsch, II | H04L 43/0811 709/226 |
| 2014/0372533 A1* | 12/2014 | Fu | G06F 9/5072 709/204 |
| 2015/0058486 A1* | 2/2015 | Huang | G06F 9/4856 709/226 |
| 2015/0074278 A1* | 3/2015 | Maes | H04L 67/10 709/226 |
| 2016/0142261 A1* | 5/2016 | Huang | H04L 41/0896 709/223 |
| 2017/0139695 A1 | 5/2017 | Govindaraju et al. | |
| 2018/0191599 A1 | 7/2018 | Balasubramanian et al. | |
| 2018/0267830 A1 | 9/2018 | Rivera et al. | |
| 2020/0004582 A1* | 1/2020 | Fornash | H04L 67/1097 |

OTHER PUBLICATIONS

Poitras, Steven. "The Nutanix Bible" (Jan. 11, 2014), from http://stevenpoitras.com/the-nutanix-bible/ (Publication date based on indicated capture date by Achive.org; first publication date unknown); pp. all.

Poitras, Steven. "The Nutanix Bible" (Jun. 20, 2014), from http://stevenpoitras.com/the-nutanix-bible/ (Publication date based on indicated capture date by Achive.org; first publication date unknown); pp. all.

Poitras, Steven. "The Nutanix Bible" (Jan. 7, 2015), from http://stevenpoitras.com/the-nutanix-bible/ (Publication date based on indicated capture date by Achive.org; first publication date unknown); pp. all.

Poitras, Steven. "The Nutanix Bible" (Jun. 9, 2015), from http://stevenpoitras.com/the-nutanix-bible/ (Publication date based on indicated capture date by Achive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Deploying applications with blueprints,https://www.ibm.com/support/knowledgecenter/en/SS4GSP_6.2.4/com.ibm.edt.doc/topics/blueprint_deploy_app.html, downloaded circa Jul. 4, 2019, 7 pages.

Cano, Ignacio et al. "Curator: Self-Managing Storage for Enterprise Clusters"; University of Washington; published Mar. 2017; pp. all.

vRealize Automation, https://web.archive.org/web/20160822031524/https://www.vmware.com/in/products/vrealize-automation.html , Aug. 26, 2016, 03 pages.

Workspace ONE, https://web.archive.org/web/20160625042548/https://www.vmware.com/in/products/workspace-one.html, Jun. 25, 2016, 02 pages.

"The Avi Vintage Platform Overview", https://web.archive.org/web/20190226100623/https://avinetworks.com/why-avi/application-delivery-platform/, Feb. 26, 2019, 03 Pages.

Brandon Scott, "Nutanix Move for AWS (Linux)", http://community.mypuresupport.com/nutanix-xtract-for-aws-linux/, Oct. 9, 2018, 05 Pages.

Artur Krzywdzinski, "Nutanix Xtract—an easy way to migrate to Nutanix—Part 1", https://vmwaremine.com/2018/04/17/easy-migration-to-nutanix-acropolis-part-1/#sthash.9TV4UyFU.vON7Z26I.dpbs, Apr. 17, 2018, 10 Pages.

"Nutanix Move", https://web.archive.org/web/20190326054225/https://www.nutanix.com/products/move/ , Mar. 26, 2019, 04 Pages.

Rabetski et al., "Migration of an On-Premise Application to the Cloud: Experience Report," www.cse.chalmers.se, accessed on Dec. 18, 2018, pp. 1-38.

"Migrating Applications to Public Cloud Services: Roadmap for Success Version 2.0," www.omg.org, Feb. 2018, pp. 1-38.

"Purpose-Built, Enterprise-Grade Migration to Google Cloud," cloud.google.com, accessed on Dec. 18, 2018, pp. 1-9.

* cited by examiner

```
{
  "variable_list": [],
  "tier": "",
  "depends_on_list": [
    {
      "kind": "app_service",
      "name": "MYSQL",
      "uuid": "31db299a-9cc3-4fdc-8895-f5d44b24b14d"
    }
  ],──525
  "singleton": false,
  "name": " APACHE_PHP ",──522
  "uuid": "7db81d1d-bd1f-4424-bd5c-03f432a8e47b",
  "port_list": [],
  "description": ""
},
```
520

```
{
  "variable_list": [],
  "tier": "",
  "depends_on_list": [],──515
  "singleton": false,
  "name": "MYSQL",──512
  "uuid": "31db299a-9cc3-4fdc-8895-f5d44b24b14d",
  "port_list": [],
  "description": ""
},
```
510

```
{
  "variable_list": [],
  "tier": "",
  "depends_on_list": [
    {
      "kind": "app_service",
      "name": " APACHE_PHP ",
      "uuid": "7db81d1d-bd1f-4424-bd5c-03f432a8e47b"
    }
  ],──535
  "singleton": false,
  "name": " HAPROXY",──532
  "uuid": "cf673061-d9df-4b92-aa88-8925156f5171",
  "port_list": [],
  "description": ""
},
```
530

*FIG. 5A*

```
{
  "name": "MYSQL_AWS_Package",  ← 542
  "service_local_reference_list": [
    {
      "kind": "app_service",
      "name": "MYSQL",  ← 545
      "uuid": "31db299a-9cc3-4fdc-8895-f5d44b24b14d"
    }
  ],
  "options": {
    "install_runbook": {
      "variable_list": [],
      "main_task_local_reference": {
        "kind": "app_task",
        "name": "3df06c17_dag",
        "uuid": "46a6a130-af42-4797-8b25-f77c2a1ef04d"
      },
      "name": "6ae7ec47_runbook",
      "task_definition_list": [
        {
          ...
        },
        ...
      ]
    }
  },
  "target_any_local_reference": {
    "kind": "app_package",
    "name": "MYSQL_AWS_Package",
    "uuid": "76473418-1402-420e-8f86-90ebc0898150"
  },
  ...
  ],
  ...},
  "state": "ACTIVE"
}
```
547

540

```
{
  "variable_list": [],
  "action_list": [],
  "name": "MYSQL_AWS",  ← 552
  ...
  "os_type": "Linux",
  "type": "AWS_VM",  ← 555
  "readiness_probe": {
    "connection_type": "SSH",
    "retries": "5",
    "disable_readiness_probe": false,
    "timeout_secs": "300",
    "address": "@@{public_ip_address}@@",
    "connection_port": 22,
    "login_credential_local_reference": {
      ...
    },
    "uuid": "397d92af-2971-4f7b-9500-590e3e2c2821",
    "description": ""
  },
}
```

```
{
 "name": "AWS", ← 562
 "deployment_create_list": [
  {...
   "substrate_local_reference": {... ← 567
    "name": "MYSQL_AWS",
    ...},
   "package_local_reference_list": [{... ← 568
    "name": "MYSQL_AWS_Package",
    ...}]},
  {...
   "substrate_local_reference": {...
    "name": "APACHE_PHP_AWS",
    ...},
   "package_local_reference_list": [{...
    "name": "APACHE_PHP_Package",
    ...}]},
  {...
   "substrate_local_reference": {...
    "name": "HAPROXY_AWS",
    ...},
   "package_local_reference_list": [{...
    "name": "HAPROXY_AWS_Package",
    ...}]}
 ],
 ...}

565
```
560

```
{
 "name": "Nutanix", ← 572
 "deployment_create_list": [
  {...
   "substrate_local_reference": {...
    "name": "MYSQL_NUTANIX_VM",
    ...},
   "package_local_reference_list": [{...
    "name": "MYSQL_PACKAGE",
    ...}]},
  {...
   "substrate_local_reference": {...
    "name": "APACHE_PHP_NUTANIX_VM",
    ...},
   "package_local_reference_list": [{...
    "name": "APACHE_PHP_PACKAGE",
    ...}]},
  {...
   "substrate_local_reference": {...
    "name": "NGNIX_NUTANIX_VM",
    ...},
   "package_local_reference_list": [{...
    "name": "NGNIX_PACKAGE",
    ...}]},
  {...
   "substrate_local_reference": {...
    "name": "MONDRIAN_OLAP_NUTANIX_VM",
    ...},
   "package_local_reference_list": [{...
    "name": "MONDRIAN_OLAP_PACKAGE_NUTANIX",
    ...}]}
 ],
 ...};
```
570

580
```
{
  "description": "",
  "connection_type": "SSH",
  "disable_readiness_probe": false,
  "timeout_secs": "300",
  "address": "@@{platform.status.resources.nic_list[0].ip_endpoint_list[0].ip}@@",
  ...
},
```

585
```
"service_local_reference_list": [
  {
    "kind": "app_service",
    "name": "HAPROXY"
  }
],
"child_tasks_local_reference_list": [
  {
    "kind": "app_task",
    "name": "PackageInstallTask"
  }
],
"attrs": {
  "script": "#!/bin/bash\nset -ex\nsudo setenforce 0\nsudo sed -i ...
   (echo \"@@{APACHE_PHP.address}@@\" | sed 's/^,//' | ... ;
   ...
}
```

MOBILITY OF USER APPLICATIONS ACROSS CLOUD INFRASTRUCTURES

PRIORITY CLAIM

The instant patent application is related to and claims priority from the co-pending India provisional patent application entitled, "MOBILITY OF USER APPLICATIONS ACROSS CLOUD INFRASTRUCTURES", Serial No.: 201941028132, Filed: 12 Jul. 2019, which is incorporated in its entirety herewith.

BACKGROUND OF THE DISCLOSURE

Technical Field

The present disclosure relates to cloud computing and more specifically to mobility of user applications across cloud infrastructures.

Related Art

Cloud infrastructure refers to a collection of processing nodes, connectivity infrastructure, data storages, etc., which can be engineered to together provide a corresponding virtual computing infrastructure for various customers, with the scale of each computing infrastructure being specified often on demand.

User applications are often executed on respective cloud infrastructures. Each user application processes requests received from users, and provides corresponding responses. A user application may rely on various computing, networking and storage capabilities provided by the cloud infrastructures.

There is often a need to move a user application across cloud infrastructures, i.e., from one cloud infrastructure (source) to another (target). Such a move generally requires the user application to be ready for processing requests after the user application is deployed in the target cloud infrastructure.

Aspects of the present disclosure are related to facilitating mobility of user applications across cloud infrastructures.

BRIEF DESCRIPTION OF THE DRAWINGS

Example embodiments of the present disclosure will be described with reference to the accompanying drawings briefly described below.

FIGS. 5A-5D illustrates the manner in which setup data for a user application in corresponding cloud infrastructures is maintained in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
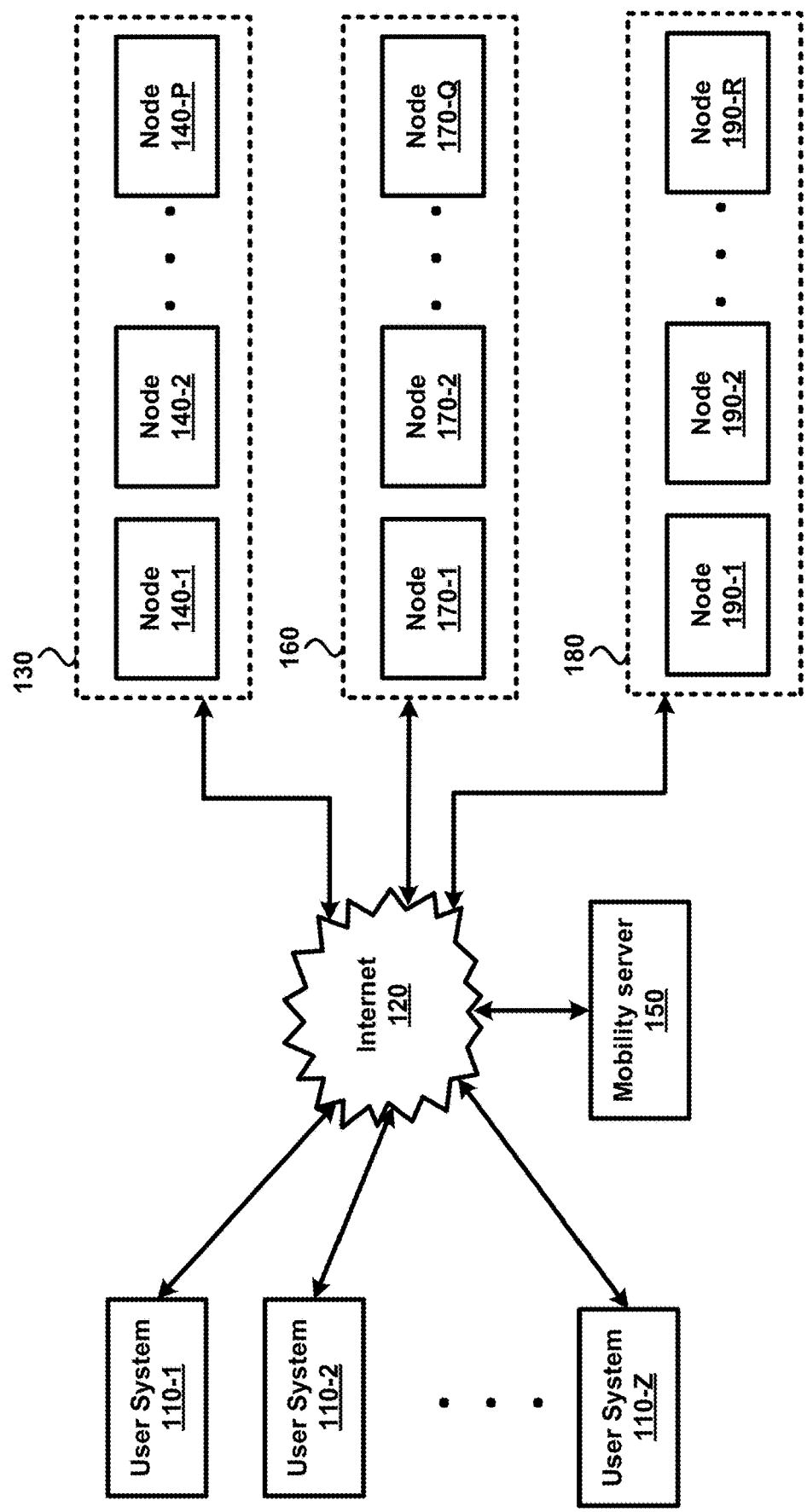
FIG. 1 is a block diagram illustrating an example environment (computing system) in which several aspects of the present invention can be implemented.

An aspect of the present disclosure facilitates mobility of user applications across cloud infrastructures. In one embodiment, a mobility server maintains a setup data which indicates that a user application is to be operative based on a specific set of application components when the user application is to be hosted on a cloud infrastructure. Upon receiving a request to move the user application currently executing in a source cloud infrastructure to the cloud infrastructure, mobility server provisions the specific set of application components in the cloud infrastructure in view of the setup data and then executes the user application in the cloud infrastructure based on the specific set of application components.

In an embodiment, the set of application components indicated in the setup data contains application services and infrastructure components, with the infrastructure components including a set of virtual machines (VMs) hosting the set of application components in the cloud infrastructure.

According to another aspect of the present disclosure, the setup data (noted above) further indicates a set of dependencies among the set of application components, wherein each dependency indicates that a caller component uses a called component. The mobility server accordingly initiates execution of each of the set of application components according to an order defined by the set of dependencies, wherein the order is set to initiate execution of each called component before (initiating execution of) the corresponding caller component indicated by the corresponding dependency.

According to one more aspect of the present disclosure, the setup data (noted above) further includes a configuration data for the set of application components. The mobility server accordingly configures, after the provisioning and prior to the executing, each of the set of application components according to the configuration data.

According to yet another aspect of the present disclosure, the mobility server determines a state data for the user application in the source cloud infrastructure and copies, prior to the executing, the state data from the source cloud infrastructure to the cloud infrastructure. Thus, assuming that the provisioning, configuring and copying are completed successfully, the user application is ready for processing requests received from users after execution in the target cloud infrastructure.

Thus, it may be appreciated that the various characteristics of the deployed user application (except the state data) depend on the setup data, instead of the deployment details in the source cloud infrastructure. Such characteristics may be indicated in the setup data for different cloud infrastructures as described below.

According to an aspect of the present disclosure, a mobility server maintains setup data indicating respective application profiles in corresponding cloud infrastructures for a user application. Upon receiving a request to move the user application currently executing in a source cloud infrastructure to a target cloud infrastructure, the mobility server inspects the setup data to identify an application profile for the user application in the target cloud infrastructure. The mobility server then deploys the user application in the target cloud infrastructure according to the application profile.

According to one more aspect of the present disclosure, the (first) set of application components based on which a user application is operative in a first cloud infrastructure includes an application component of a component type, which is not present in a (second) set of application components based on which the same user application is operative in a second cloud infrastructure.

According to yet another aspect of the present disclosure, the (first) set of application components based on which a user application is operative in a first cloud infrastructure includes a first number of instances of a component type, while and a (second) set of application components based on which the same user application is operative in a second cloud infrastructure includes a second number of instances of the same component type, wherein the first number does not equal the second number.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing user systems 110-1 through 110-Z (Z representing any integer), Internet 120, mobility server 150, and cloud infrastructures 130, 160 and 180. Cloud infrastructure 130 in turn is shown containing nodes 140-1 through 140-P (P representing any natural number). Cloud infrastructure 160 in turn is shown containing nodes 170-1 through 170-Q (Q representing any natural number). Cloud infrastructure 180 in turn is shown containing nodes 190-1 through 190-R (R representing any natural number). The user systems and nodes are collectively referred to by 110, 140, 170 and 190 respectively.

Merely for illustration, only representative number/type of systems is shown in FIG. 1A. Many environments often contain many more systems, both in number and type, depending on the purpose for which the environment is designed. Each block of FIG. 1A is described below in further detail.

Each of cloud infrastructures 130, 160 and 180 is a collection of processing nodes (140, 170 and 190), connectivity infrastructure, data storages, administration systems, etc., which are engineered to together provide a virtual computing infrastructure for various customers, with the scale of such computing infrastructure being specified often on demand. Cloud infrastructure 130/160/180 may be one of Amazon Web Services (AWS) Cloud available from Amazon.com, Inc., Google Cloud Platform (GCP) available from Google LLC, Azure cloud available from Microsoft, Inc., Xi cloud available from Nutanix etc., or a private cloud such as an On-Premises cloud owned by the customers/tenants.

All the systems of each cloud infrastructure 130/160/180 are assumed to be connected via an intranet. Internet 120 extends the connectivity of these (and other systems of the cloud infrastructures) with external systems such as user systems 110 and mobility server 150. Each of intranet and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranets. When the packet contains content such as port numbers, which specifies a target application, the packet may be said to be directed to such application as well.

Each of user systems 110 represents a system such as a personal computer, workstation, mobile device, computing tablet etc., used by users to generate (user) requests directed to enterprise/user applications executing in cloud infrastructures 130/160/180. The user requests may be generated using appropriate user interfaces (e.g., web pages provided by a user application executing in a node, a native user interface provided by a portion of a user application downloaded from a node, etc.).

In general, an user system requests a user application for performing desired tasks and receives the corresponding responses (e.g., web pages) containing the results of performance of the requested tasks. The web pages/responses may then be presented to the user by local applications such as the browser. Each user request is sent in the form of an IP packet directed to the desired system or user application, with the IP packet including data identifying the desired tasks in the payload portion.

Some of nodes 140/170/190 may be implemented as corresponding data stores. Each data store represents a non-volatile (persistent) storage facilitating storage and retrieval of data by applications executing in the other systems/nodes of cloud infrastructures 130/160/180. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 140/170/190 may be implemented as corresponding server systems. Each server system represents a server, such as a web/application server, executing enterprise applications (examples of user applications) capable of performing tasks requested by users using user systems 110. A server system receives a user request from a user system and performs the tasks requested in the user request. A server system may use data stored internally (for example, in a non-volatile storage/hard disk within the server system), external data (e.g., maintained in a data store/node) and/or data received from external sources (e.g., from the user) in performing the requested tasks. The server system then sends the result of performance of the tasks to the requesting user system (one of 110) as a corresponding response to the user request. The results may be accompanied by specific user interfaces (e.g., web pages) for displaying the results to the requesting user.

In one embodiment, each customer/tenant is provided with a corresponding virtual computing infrastructure (referred to as a "cloud") provisioned on the nodes of cloud infrastructures 130, 160 and 180. The virtual infrastructure contains computing resources (e.g., virtual machines, operating systems hosted on VMs), network resources (e.g., public IP addresses) and storage resources (e.g., database systems, file systems). Each tenant may deploy desired user applications/data services on the resources provided as a part of their cloud(s), with the services being capable of processing user requests received from user systems 110.

In general it may be appreciated that the term provisioning of an execution entity (user application, VM, etc.) implies allocation of resources for the execution entity in a node of the cloud infrastructure. The term hosting of an execution entity implies that the execution entity is ready for execution, and such hosting entails loading of an image data corresponding to the execution entity into a memory, allocating of external resources such as network/IO ports for the hosted execution entity, and configuring the hosted execution entity (assuming that the image data is not of a preconfigured version). The term deploying of an execution entity implies provisioning, hosting and execution of the software instructions of the loaded image.

The manner in which user applications may be deployed in a cloud infrastructure (such as 130/160/180) is described below with examples.

3. Deploying User Applications in a Cloud Infrastructure

It may be first appreciated that each user application may be deployed based on application components hosted on nodes of a cloud infrastructure. An application component represents an execution entity forming a part of the user application, and can be one of an application service or an infrastructure component. An application service is an executing entity/process delivering (to users) one or more of the intended functionalities of the user application. An infrastructure component on the other hand represents a compute, network or storage resource provided as a part of the cloud infrastructure. Thus, VMs, public IP addresses, and database systems are examples of the infrastructure components.

It may be further appreciated that dependencies exist among application components based on their usage. Specifically, when a first component uses a second component, the first component is said to be dependent on the second component as the base component with respect to that usage relationship. The usage can be express invocation, for example, when the first component invokes the second component. Alternatively, an execution entity requiring hosting on a VM is said to be dependent on the corresponding VM.

Deployment of user applications may require configuration of the user application. As is well known, a user application may be designed to operate based on values for pre-specified parameters such as number of connections in a connection pools, maximum number of threads, etc. Accordingly, configuration entails setting such pre-specified parameters to specific desired values (typically specified by a system administrator).

Upon execution of the user application, it may be appreciated that data gets accrued in an application over time and includes the user interaction driven changes that have happened in the user application. For example, data entered by users using the user interfaces provided by the user application are accrued over time. The term state data thus represents all such internally accrued data by operation/execution of the user application.

In one embodiment, clouds containing virtual machines (VMs) form the basis for deployment of various user/enterprise applications in the nodes of cloud infrastructures 130/160/180. As is well known, a virtual machine may be viewed as a container in which other execution entities are executed. A node/server system can typically host multiple virtual machines, and the virtual machines provide a view of a complete machine (computer system) to the user applications executing in the virtual machine.

Figure 2B:
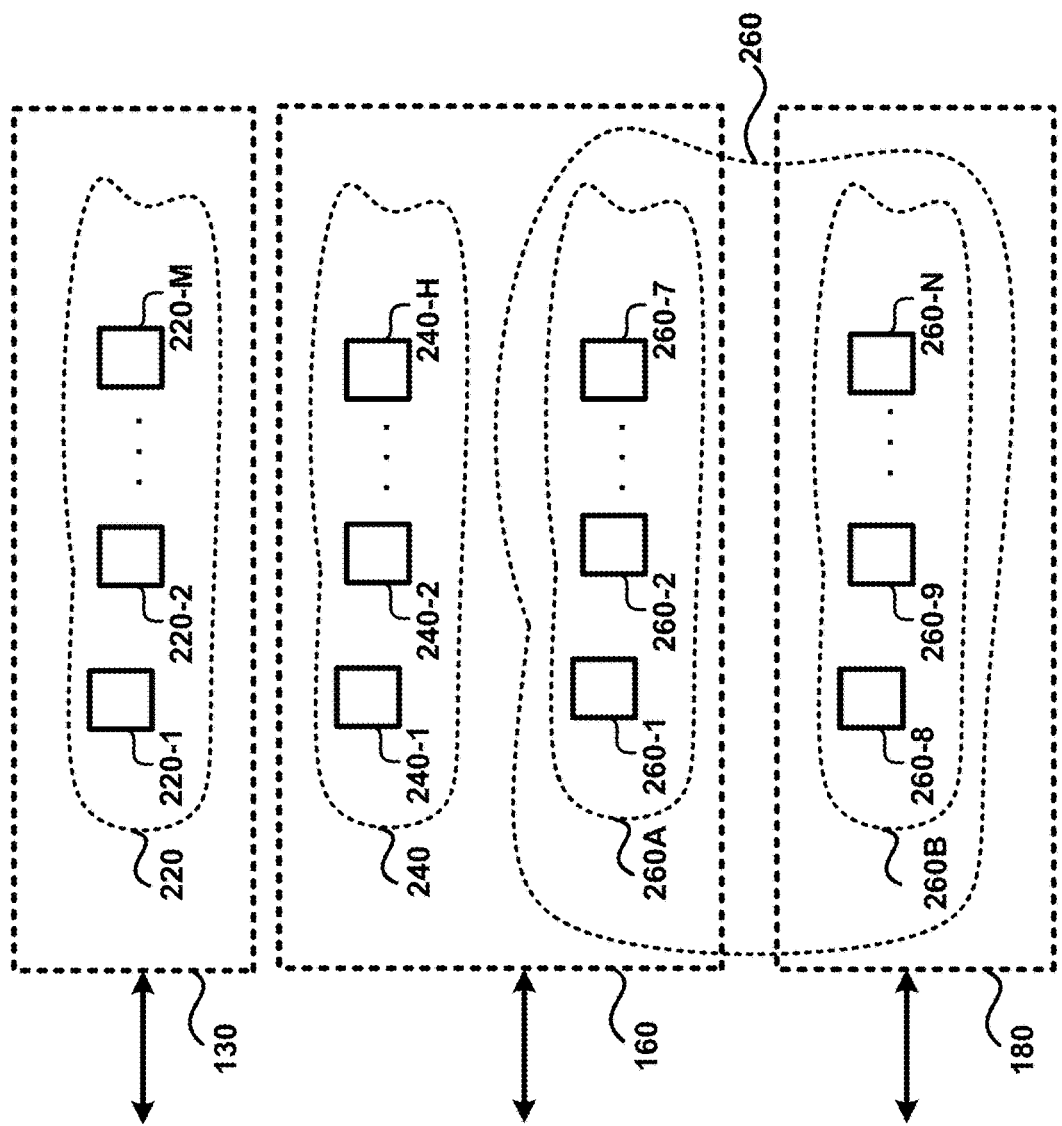
FIG. 2B illustrates the manner in which clouds (and correspondingly user applications) are deployed in cloud infrastructures in one embodiment.
Figure 2A:
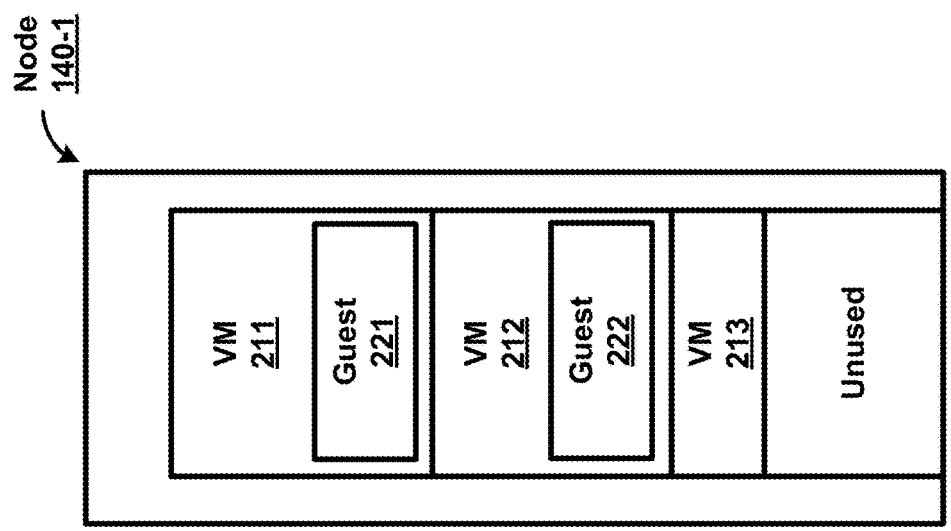
FIG. 2A illustrates an example execution state within a node of a cloud infrastructure.

FIG. 2A illustrates an example execution state within a node of a cloud infrastructure. Node 140-1 is shown provisioned with, and accordingly hosting VMs 211, 212, 213, with the resources of the node shown allocated among the three VMs and some resources shown as still remaining 'unused' (i.e., not provisioned for any execution entity within node 140-1). Some of VMs 211-213 is shown hosting guest (modules) 221 and 222. Guest modules 221/222 may correspond to one of an application service or infrastructure component provided as part of the user application deployed in cloud infrastructure 130. Similarly, other VMs may be hosted in the other nodes of cloud infrastructures 130/160/180 and form the basis for deploying user applications in those cloud infrastructures.

FIG. 2B illustrates the manner in which clouds (and correspondingly user applications) are deployed in cloud infrastructures in one embodiment. Specifically, the Figure illustrates the manner in which clouds 220, 240 and 260 are deployed in the nodes of cloud infrastructures 130/160/180 using VMs. Only a sample set of clouds is shown in FIG. 2B for illustration, though many environments often host a large number (100+) clouds across multiple cloud infrastructures.

Cloud 220 is shown containing VMs 220-1 through 220-M (M representing any natural number) that may be provisioned on the different nodes 140 of cloud infrastructure 130, while cloud 240 is shown containing VMs 240-1 through 240-H (H representing any natural number) that may be provisioned on the different nodes 170 of cloud infrastructure 160.

Cloud 260 is shown containing VMs provisioned on some of nodes 170 and also in some of nodes 190. Cloud 260 may accordingly be viewed as a "hybrid" cloud provisioned across the nodes of multiple cloud infrastructures (160 and 180). Specifically, groups 260A and 260B respectively represents the set of VMs provisioned in cloud infrastructures 160 and 180.

A customer/tenant owning a cloud (e.g. 220) may deploy desired user applications for execution in the cloud. In the following description, it is assumed that a user has deployed an LAMP (Linux operating system, Apache HTTP Server, MySQL relational database management system, and PHP programming language) based ERP (enterprise resource planning) application (example of a user application) on three VMs 220-1, 220-2 and 220-3 which in turn are hosted on nodes 140 in cloud infrastructure 130. A customer may wish to move the LAMP/ERP application from one set of (source) VMs/nodes to another set of (target) VMs/nodes, with the source and target sets of nodes residing in the same or different cloud infrastructures (130/160/180). Such mobility of the user application may be desirable for reasons such as changing of the cloud infrastructure provider (e.g. from Amazon to Microsoft), reducing the cost of deployment (e.g. moving from higher cost VMs/nodes to lower cost VMs/nodes) potentially dynamically, to avail better support, services, security and/or additional features offered by the target cloud infrastructure, etc.

Mobility server 150, provided according to several aspects of the present disclosure, facilitates mobility of user applications across cloud infrastructures 130/160/180. Though mobility server 150 is shown external to cloud infrastructures 130/160/180, in alternative embodiments, mobility server 150 may be implemented internal to one of cloud infrastructures 130/160/180, for example, in one of nodes 140/170/190. The manner in which mobility server 150 mobility of user applications across cloud infrastructures is described below with examples.

4. Facilitating Mobility of User Applications Across Cloud Infrastructures

Figure 3:
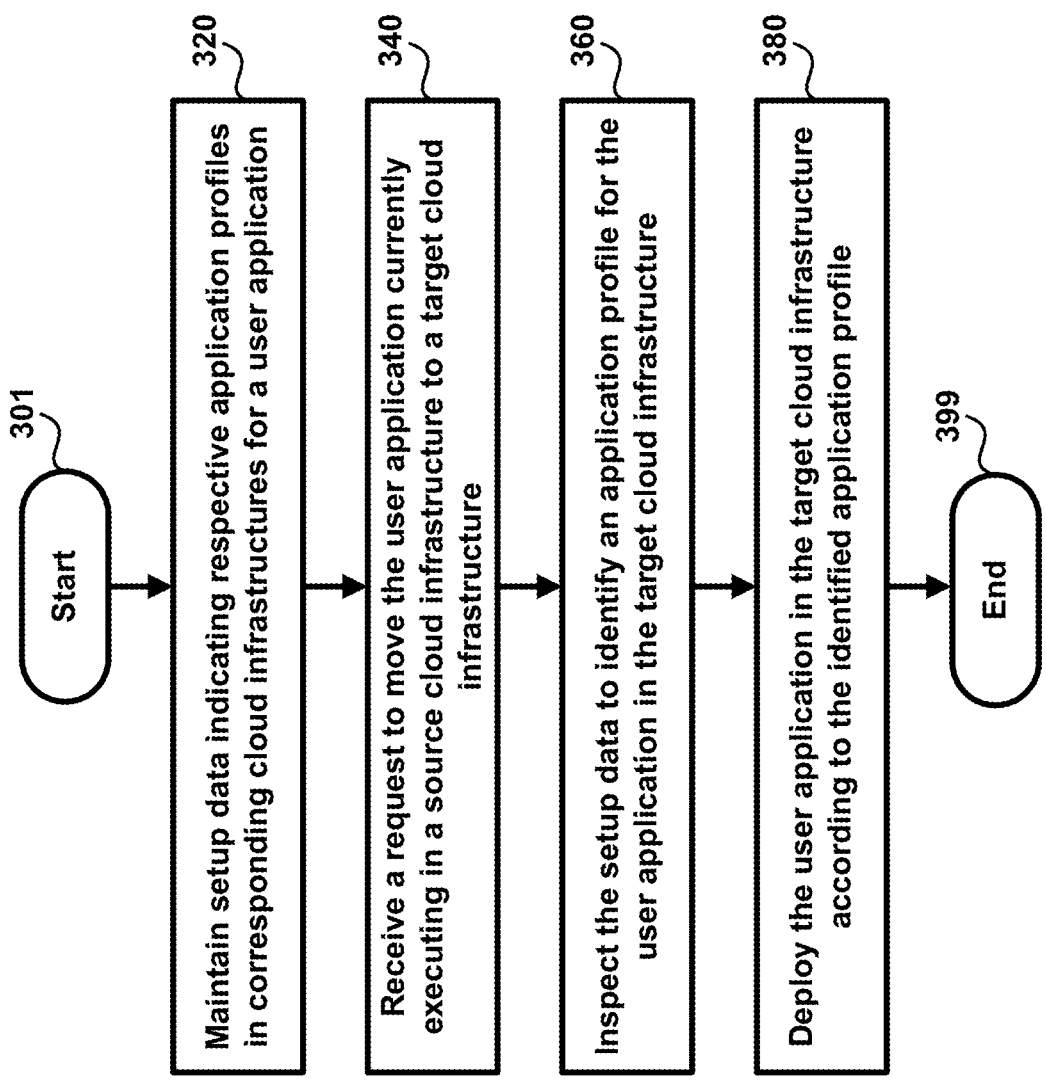
FIG. 3 is a flow chart illustrating the manner in which mobility of user applications across cloud infrastructures is facilitated according to aspects of the present disclosure.

FIG. 3 is a flow chart illustrating the manner in which mobility of user applications across cloud infrastructures is facilitated according to aspects of the present disclosure. The flowchart is described with respect to the systems of FIGS. 1, 2A and 2B, in particular mobility server 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 320.

In step 320, mobility server 150 maintains setup data indicating respective application profiles in corresponding cloud infrastructures (such as 130, 160 and 180) for a user application. Each application profile indicates the deployment details of the user application for a corresponding cloud infrastructure. In particular, the application profile indicates the set of application components constituting the user application, dependencies among the application components, and the applicable configuration data, if any, for the application components.

The setup data may be maintained internally (for example, in a hard disk within mobility server 150) or in an external data store (not shown in FIG. 1) associated with mobility server 150. The setup data may be maintained in any convenient format, such as, as a table in a database server according to relational database technologies.

In step 340, mobility server 150 receives a request to move the user application currently executing in a source cloud infrastructure to a target cloud infrastructure. The request may be received from a user (such as a customer/tenant) using one of user systems 110. The user application in the source cloud infrastructure sought to be moved, and the target cloud infrastructure may be identified by corresponding unique identifiers in the request.

In the following description, it is assumed that the received request is for moving the above noted LAMP/ERP application currently deployed on three VMs 220-1, 220-2 and 220-3 from source cloud infrastructure 130 to target cloud infrastructure 160.

In step 360, mobility server 150 inspects the setup data to identify an application profile for the user application in the target cloud infrastructure. The inspecting may be performed in a known way, for example using a SQL query containing the identifier of the target cloud infrastructure when the setup data is maintained as a table according to relational database technologies. For example, for the above noted request, mobility server 150 determines the application profile for the LAMP/ERP application in cloud infrastructure 160.

In step 380, mobility server 150 deploys the user application in the target cloud infrastructure according to the identified application profile. As noted above, deployment may entail provisioning the application components indicated by the application profile in the target cloud infrastructure (160), configuring the application components according to the configuration data contained in the application profile, and executing the application components according to the dependencies specified in the application profile.

It may be appreciated that the user/LAMP/ERP application may have associated state data in the source cloud infrastructure and accordingly the state data in the source cloud infrastructure needs to be replicated in the target cloud infrastructure for continuity in the processing of user requests. According to an aspect, mobility server 150 determines a state data for the user application in the source cloud infrastructure (130) and copies, prior to the executing, the state data from the source cloud infrastructure to the cloud infrastructure (160).

By the steps of provisioning, configuring, copying and executing, the user application (such as the LAMP/ERP application) is in a state ready for processing user requests received from user systems 110. The flow chart ends in step 399.

Thus, mobility server 150 facilitates mobility of user applications across cloud infrastructures 130/160/180. It may be appreciated that the various characteristics (components, dependencies, configuration, etc.) of the deployed LAMP/ERP/user application (except the state data) depend on the application profile/setup data, instead of the deployment details in the source cloud infrastructure. The manner in which mobility server 150 provides several aspects of the present disclosure according to the steps of FIG. 3 is illustrated below with examples.

5. Illustrative Example

FIGS. 4A-4B, 5A-5C and 6A-6B together illustrate the manner in which mobility of user applications across cloud infrastructures is facilitated in one embodiment. Each of the Figures is described in detail below.

Figure 4A:
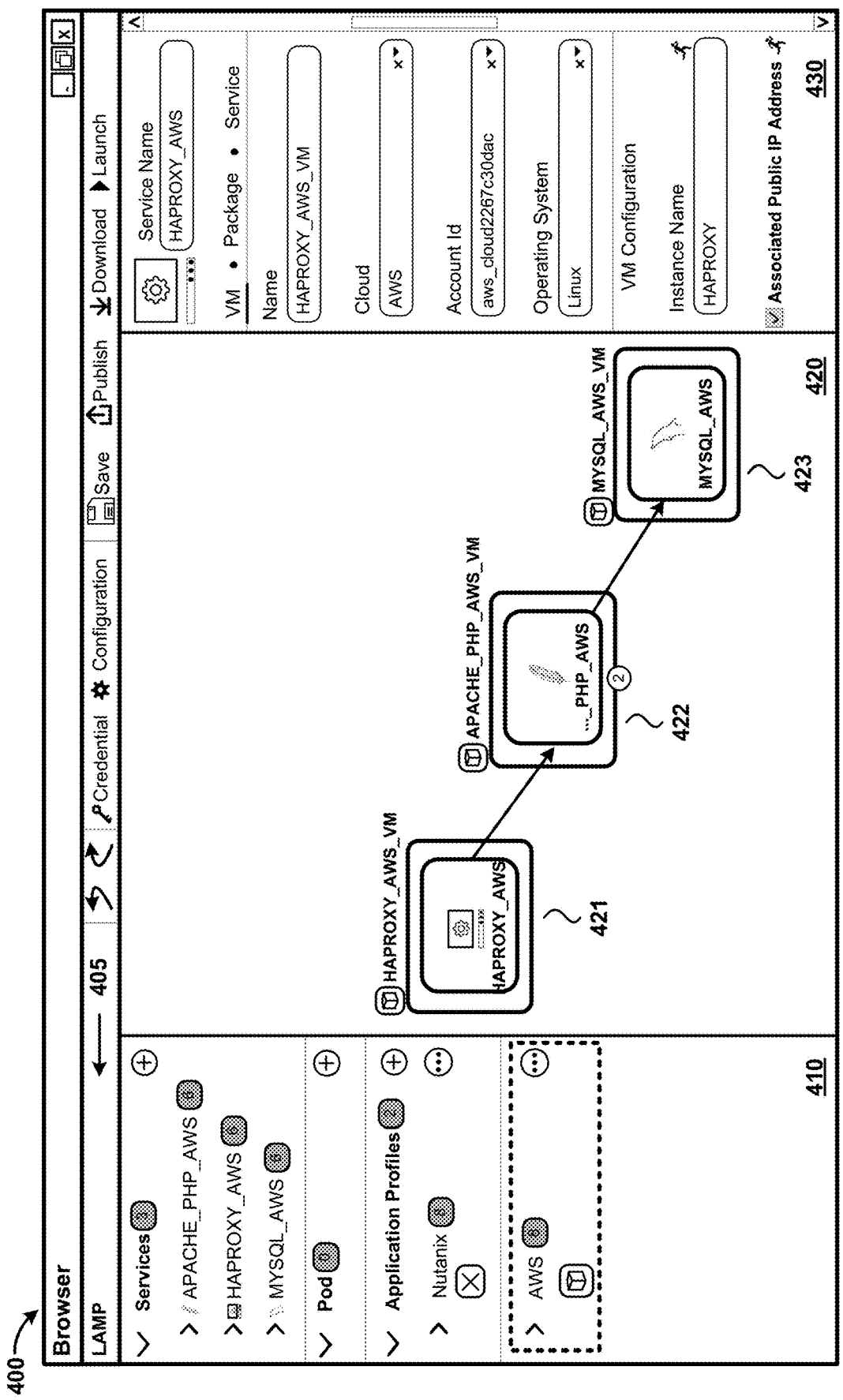
FIGS. 4A and 4B depicts the manner in which a user is facilitated to specify setup data for a user application in corresponding cloud infrastructures in one embodiment.
Figure 4B:
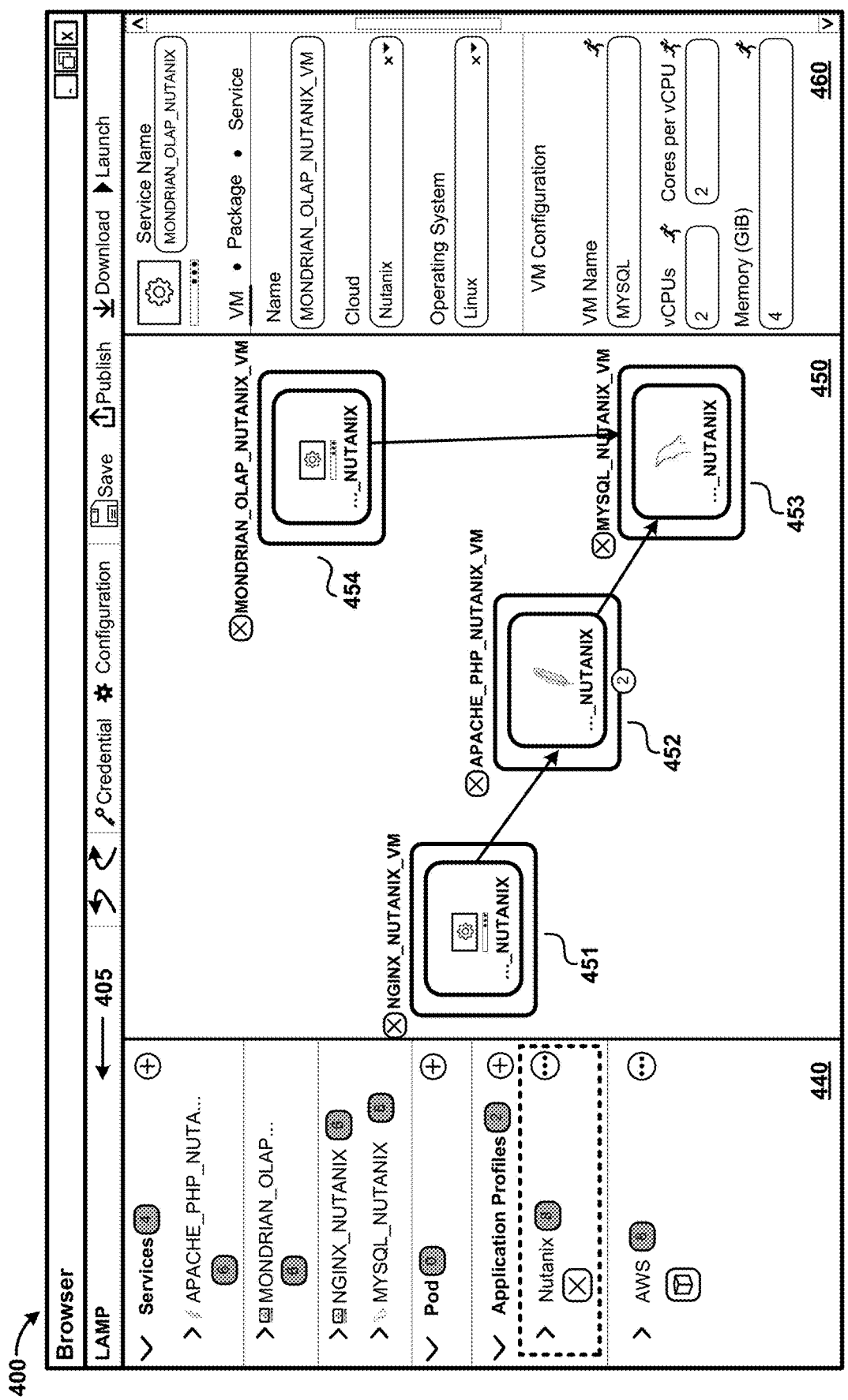

FIGS. 4A and 4B depicts the manner in which a user is facilitated to specify setup data for a user application in corresponding cloud infrastructures in one embodiment. Display area 400 represents a portion of a user interface displayed on a display unit (not shown) associated with one of user systems 110. In one embodiment, display area 400 corresponds to a web page rendered by a browser executing on a user system. The web pages may be provided by mobility server 150 in response to a user (such as a customer/tenant, administrator, etc.) sending appropriate requests (for example, by specifying corresponding Uniform Resource Locator (URL) in the address bar) using the browser.

Display area 400 of FIGS. 4A/4B accordingly depicts a portion of a user interface displayed in the browser (executing in user system 110-1, for illustration) in response to a user specifying a corresponding URL. Display area 405 indicates that the user is specifying the setup data for a LAMP/ERP application.

Display area 410 indicates that the user has specified two application profiles for the user application corresponding to the cloud infrastructures AWS (Amazon Web Service) and Nutanix respectively. Display area 410 further indicates the application services specified by the user for the user application in AWS cloud infrastructure (shown selected by the dotted rectangle around AWS in display area 410).

Display area 430 enables the user to specify the details of each application service (such as "HAPROXY_AWS" indicted by the service name). In particular, display area 430 enables the user to specify the details of the application service, any underlying packages (infrastructure components) required for execution of the application services, and any VMs required for execution of the application service and/or package/infrastructure component.

Display area 420 depicts a pictorial/graphical representation of the various services/components for the user application (LAMP/ERP application) in AWS infrastructure. In particular, display areas 421, 422 and 423 represent three components of the LAMP application as specified by the user using display area 430.

Display area 421 represents a HAPROXY_AWS service (an instance of HAProxy, a high availability load balancer) hosted on a corresponding VM named HAPROXY_AWS_VM, display area 422 represents an APACHE_PHP_AWS service (an instance of the APACHE web/application server) hosted on a corresponding VM named APACHE_PHP_AWS_VM, while display area 423 represents an MYSQL_AWS service (an instance of the MySQL database server) hosted on a corresponding VM named MYSQL_AWS_VM.

Arrows linking the display areas 411, 412 and 413 indicate the dependencies among the components, with the component at the start of the arrow being the dependent component and the component at the end/pointed tip of the arrow indicating the base component. As such, the arrow directed from display area 411 to 412 indicates that HAPROXY_AWS service is dependent on (that is uses/invokes) the APACHE_PHP_AWS service. Such a dependency implies that the execution of HAPROXY_AWS service (and corresponding VM) can be initiated only after the execution (or initiation) of APACHE_PHP_AWS service (and corresponding VM). Similarly, the arrow directed from display area 412 and 413 implies that the APACHE_PHP_AWS service is in turn dependent on (and accordingly can be initiated only after) the MYSQL_AWS service.

Though not explicitly shown, it may be appreciated that dependencies also exist between the services and the underlying infrastructure components. For example, APACHE_PHP_AWS service depends on (uses) the APACHE_PHP_AWS_VM virtual machine. Similarly, the other application services may depend on corresponding virtual machines and/or other packages (not shown in the Figure).

Referring to FIG. 4B, display area 440 indicates the application services specified by the user for the user application in Nutanix cloud infrastructure (shown selected by the dotted rectangle around Nutanix in display area 440). Display area 460 indicates that the user is specifying the details for the "MONDRIAN_OLAP_NUTANIX" service (as indicted by the service name) there.

Display area 450 depicts a pictorial/graphical representation of the various services/components for the user application (LAMP/ERP application) in Nutanix infrastructure. In particular, display areas 451, 452, 453 and 454 represent the four services/application components of the LAMP application as specified by the user using display area 460.

Display areas 451, 452, 453 and 454 respectively represent a NGINX_NUTANIX service (an instance of Nginx, a high availability load balancer), APACHE_PHP_NUTANIX service (an instance of the APACHE web/application server), MYSQL_NUTANIX service (an instance of the MySQL database server) and MONDRIAN_OLAP_NUTANIX service (an instance of Mondrian OLAP server). Each of the services is shown hosted on a corresponding VM.

Furthermore, the directed arrows in display area 450 indicate that the NGINX_NUTANIX service is dependent on (that is uses) the APACHE_PHP_NUTANIX service, which in turn is dependent on (uses) the MYSQL_NUTANIX service. In addition, the MONDRIAN_OLAP_NUTANIX service is also shown dependent on (using) the MYSQL_NUTANIX service.

Thus, a user is enabled to specify the setup data/application profiles for a user application (LAMP/ERP application) in corresponding cloud infrastructures (AWS and Nutanix). The manner in which mobility server 150 maintains setup data is illustrated below with examples.

6. Setup Data

FIGS. 5A-5C illustrates the manner in which setup data for a user application in corresponding cloud infrastructures is maintained in one embodiment. For illustration, the setup data is shown maintained according to JSON (JavaScript Object Notation). However, in alternative embodiments, the user data may be maintained according to other data formats (such as extensible markup language (XML), etc.) and/or using other data structures (such as database tables, lists, trees, etc.), as will be apparent to one skilled in the relevant arts by reading the disclosure herein.

An example setup data for a LAMP/ERP application in AWS and Nutanix cloud infrastructures is shown in Appendix A. Though shown containing application profiles for two cloud infrastructures, it may be appreciated that setup data may contain the application profiles corresponding to all or most of the commercially available cloud infrastructures (including Azure assumed as the source cloud infrastructure below) to facilitate the mobility of the user application to the desired one of the cloud infrastructures.

The setup data of Appendix A may be maintained in response to the user specifying the data using the user interfaces of FIGS. 4A and 4B. Some of the portions of the example setup data are described in detail below.

Referring to FIG. 5A, data portions 510, 520 and 530 specify the details of application services. The data portions also specify the dependencies among the application services/components. In particular, data portion 510 specifies the details of the "MYSQL" service (as indicated by 512), with the empty list ([ ]) for the variable "depends_on_list" (515) indicating that the "MYSQL" component has no dependencies. In data portion 520 corresponding to the "APACHE_PHP" service (522), the variable "depends_on_list" (525) indicates that the service is dependent on the "MYSQL" service. Similarly, data portion 530 corresponding to the "HAPROXY" service (532) indicates (in 535) that the service is dependent on the "APACHE_PHP" service. The details of other application services may similarly be specified.

In one embodiment, each service is deployed as part of a package on a corresponding substrate (e.g. VM). The manner in which the setup data provides the details of packages and substrates is described below with examples.

Referring to FIG. 5B, data portion 540 provides the details of a package specified as part of the setup data. In particular, data portion 540 indicates that the name of the package is "MYSQL_AWS_Package" (542) and the service to be hosted by the package is "MYSQL" (545). In addition, data portion 547 specifies the manner in which deployment of the package and service is to be performed. Specifically, data portion 547 is shown specifying the name of an external script/runbook to be executed for installation of the package and/or service. Similarly, other scripts or runbooks may be specified for other deployment tasks such as performing configuration of the package and/or service, for uninstalling the package and/or service, etc. as will be apparent to one skilled in the relevant arts. The details of other packages may similarly be specified.

Data portion 550 provides the details of a VM/substrate specified as part of the setup data. In particular, data portion 550 indicates that that the name of the substrate is "MYSQL_AWS_VM" (552) and that the type of the substrate is a virtual machine (VM) in AWS cloud infrastructure ("AWS_VM" in 555). The details of other substrates may similarly be specified.

As noted above, setup data includes one or more applications profiles, each application profile indicating the deployment details of the user application (LAMP/ERP application) for a corresponding cloud infrastructure (AWS and Nutanix). The manner in which the setup data includes application profiles is described below with examples.

Referring to FIG. 5C, data portion 560 corresponds to the application profile for the LAMP/ERP application in AWS cloud infrastructure (562), while data portion 570 corresponds to the application profile for the same LAMP/ERP application in Nutanix cloud infrastructure (572). In particular, data portion 560 includes a deployment list containing one or more deployment steps (565), with each deployment step in turn specifying a substrate to be provisioned (567) and a corresponding list of packages to be installed by the provisioned substrate (568). In the example here, the first deployment step indicates that the "MYSQL_AWS_VM" is to be provisioned and the "MYSQL_AWS_Package" is to be hosted on the provisioned VM. It may be noted that the hosting of the "MYSQL_AWS_Package" would in turn cause the "MYSQL" service to be installed (in view of the setup data specified in data portion 540).

Thus, data portion 560 specifies that the ERP application includes "MYSQL_AWS_VM" virtual machine, "MYSQL_AWS_Package" component, "MYSQL" application service, "APACHE_PHP_AWS_VM" VM, "APACHE_PHP_Package" component, "APACHE_PHP" application service (specified as part of the APACHE_PHP_Package), "HAPROXY_AWS_VM" VM, "HAPROXY_AWS_Package" and "HAPROXY" application service (specified as part of the HAPROXY_AWS_Package) in AWS cloud infrastructure. Similarly, data portion 570 specifies the various application components of the ERP application in Nutanix cloud infrastructure.

In addition to the application components and their inter-dependencies, setup data also specifies the desired configurations of the application components. In one embodiment, the configuring of the application components is performed by external scripts/runbooks which are indicated by the setup data. In some scenarios, the configuration of an application component may be based on the deployment details of another component (typically a base component). The manner in which such inter-dependent configuration is indicated in the setup data is described below with examples.

Referring to FIG. 5D, data portion 580 specifies that the IP address of APACHE_PHP is to be used in other data portions, while data portion 585 indicates that HAPROXY Package Install task uses the IP address of APACHE_PHP service specified in data portion 580. Thus, configuration dependencies may exist among different components of the user application.

It may be appreciated that the data of FIGS. 5A-5D is generated and stored (by mobility server 150) in response to a user (administrator or customer) specifying the details using the user interfaces of FIGS. 4A and 4B. For example, data portions 560 and 570 of FIG. 5C are generated in response to a user specifying the two different application profiles in display areas 410 and 430 respectively of FIGS. 4A and 4B. The data portions of FIGS. 5A and 5B are generated in response to the user specifying the details of each application service using the display areas 430 and 460 respectively of FIGS. 4A and 4B.

Thus, mobility server 150 (generates and) maintains setup data for a user application (LAMP/ERP application) in corresponding cloud infrastructures. Mobility server 150 may then receive requests to move the LAMP/ERP application to one of the cloud infrastructures specified in the setup data. The manner in which mobility server 150 handles such requests to move the user/ERP application is described below with examples.

7. Moving a User Application

Mobility server 150 may receive (from a user), a request to move the LAMP/ERP application currently deployed on three VMs 220-1, 220-2 and 220-3 in source cloud infrastructure 130 (assumed to be Azure) to a target cloud infrastructure. The target cloud infrastructure may be one of cloud infrastructure 160 (assumed to be AWS) or cloud infrastructure 180 (assumed to be Nutanix). The description is continued assuming that the target cloud infrastructure specified in the cloud is 160 (AWS).

Upon receiving the request, mobility server 150 first inspects the setup data maintained for the user/ERP application to identify an application profile for the target cloud infrastructure 160 (AWS) specified in the request. Mobility server 150 accordingly identifies the application profile of data portion 560 of FIG. 5C. In the scenario that the setup data does not include an application profile for the target cloud infrastructure, mobility server 150 may send an error response to the request. Alternatively, mobility server 150 may provide the user interfaces of FIG. 4A-4B to the user to enable the user to specify an application profile for the target cloud infrastructure.

Mobility server 150 then determines the specific set of application components to be deployed in the target cloud architecture AWS. Based on the setup data shown in Appendix A, mobility server 150 determines that the specific set contains "MYSQL_AWS_VM", "MYSQL_AWS_Package", "MYSQL", "APACHE_PHP_AWS_VM", "APACHE_PHP_Package", "APACHE_PHP", "HAPROXY_AWS_VM", "HAPROXY_AWS_Package"

and "HAPROXY". Mobility server 150 then provisions the specific set of application components in target cloud infrastructure 160.

Figure 6B:
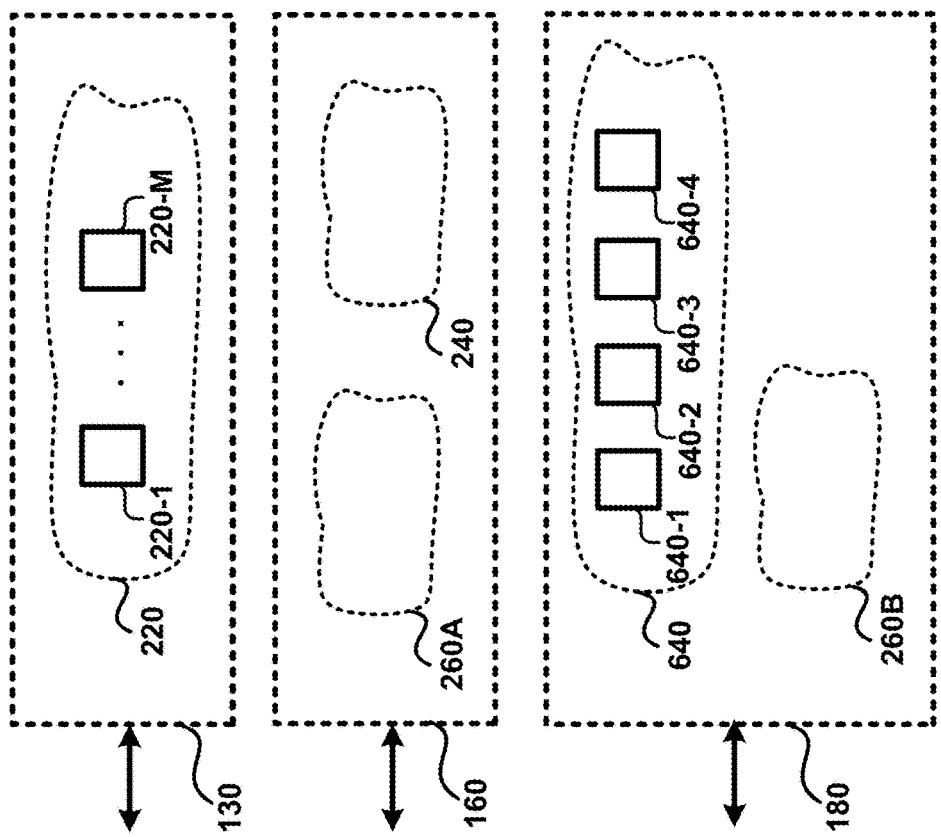
FIGS. 6A and 6B respectively depicts the result of moving a user application from a source cloud infrastructure to a corresponding target cloud infrastructure in one embodiment.
Figure 6A:
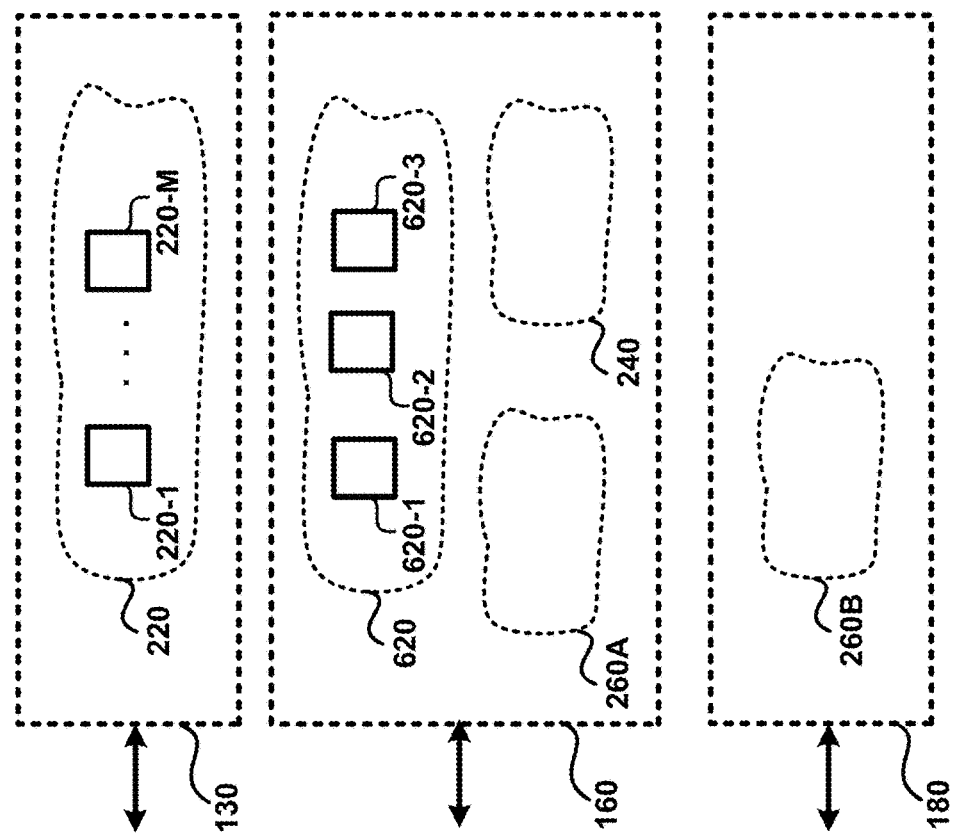

Each of FIGS. 6A and 6B depicts the result of moving a user application from a source cloud infrastructure to a corresponding target cloud infrastructure in one embodiment. In particular, FIG. 6A depicts the result of moving an LAMP/ERP application currently deployed on three VMs 220-1, 220-2 and 220-3 in source cloud infrastructure 130 (Azure) to target cloud infrastructure 160 (AWS).

Cloud 620 represents the cloud provisioned in cloud infrastructure 160 for deployment of the user/ERP application in the target cloud infrastructure (160). Cloud 620 is shown containing three VMs 620-1 through 620-3 provisioned on the different nodes 170 of cloud infrastructure 160. VMs 620-1 through 620-3 correspond to the three VMs "MYSQL_AWS_VM", "APACHE_PHP_AWS_VM", and "HAPROXY_AWS_VM" specified in the application profile for the ERP application in AWS cloud infrastructure.

Mobility server 150 may then host the three packages and three application service specified by the application profile on the VMs 620-1 through 620-3. Mobility server 150 may then configure the deployed application components according to the configuration data specified as part of the setup data.

Mobility server 150 determines a state data for the ERP application in the VMs 220-1, 220-2 and 220-3 in source cloud infrastructure 130 and then copies the state data from the source cloud infrastructure to VMs 620-1, 620-2 and 620-3 in cloud infrastructure 160. Examples of such state data may include user files and data stored in databases.

Mobile server 150 may then execute the ERP application in cloud infrastructure 160 by initiating execution of at least one application component (for example, 620-1) in the target cloud infrastructure 160. It may be appreciated that the dependencies among the application components imply a sequence order according to which the VMs/application services are to be initiated for execution. For example, for AWS, the sequence order would be MYSQL_AWS_VM, MYSQL_AWS service, APACHE_PHP_AWS_VM, APACHE_PHP_AWS service, HAPROXY_AWS_VM, and HAPROXY_AWS service. It may be appreciated that 1a component in the sequence order is to be initiated for execution only after the base component (on which it is dependent on) has been initiated for execution.

FIG. 6B depicts the result of moving an LAMP/ERP application currently deployed on three VMs 220-1, 220-2 and 220-3 in source cloud infrastructure 130 (Azure) to target cloud infrastructure 180 (Nutanix).

Cloud 640 represents the cloud provisioned in cloud infrastructure 180 for deployment of the user/ERP application in the target cloud infrastructure (180). Cloud 640 is shown containing four VMs 640-1 through 640-4 provisioned on the different nodes 190 of cloud infrastructure 180. VMs 640-1 through 640-4 corresponds to the four VMs specified in the application profile for the ERP application in Nutanix cloud infrastructure.

It may be appreciated that the number of VMs deployed in target cloud infrastructure (Nutanix) is different from the number of VMs deployed in the source cloud infrastructure. Such a difference is due to the deployment of the user application in the target cloud infrastructure based on the setup data, and not based on the architecture in the source cloud infrastructure.

It should be further appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 7:
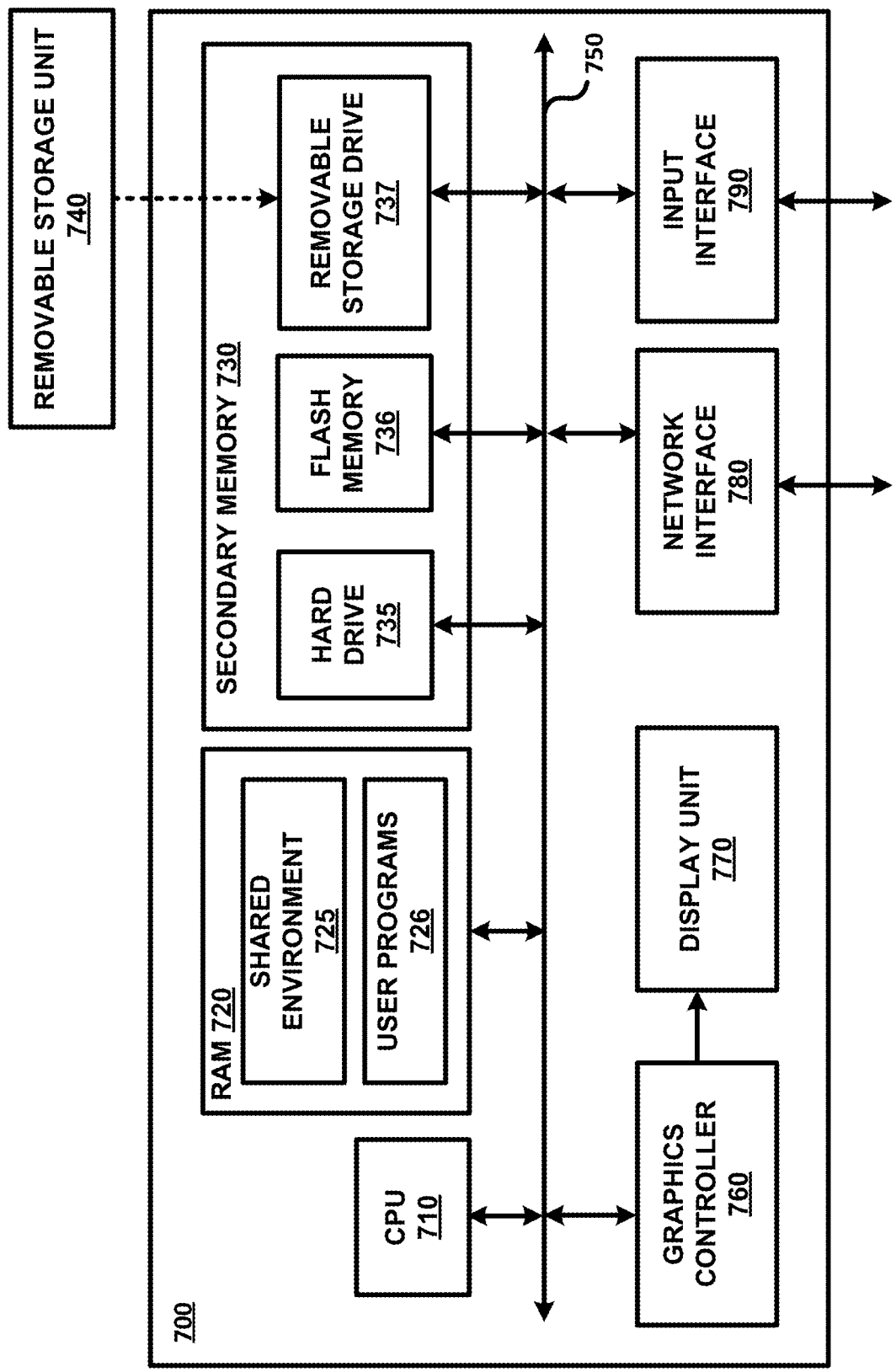
FIG. 7 is a block diagram illustrating the details of a digital processing system in which various aspects of the present disclosure are operative by execution of appropriate executable modules.

FIG. 7 is a block diagram illustrating the details of digital processing system 700 in which various aspects of the present disclosure are operative by execution of appropriate executable modules. Digital processing system 700 may correspond to mobility server 150.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or other user programs 726 (such as other applications, DBMS, etc.). In addition to shared environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals (e.g., portions of the user interfaces of FIGS. 4A and 4B). Input interface 790 may correspond to a keyboard and a pointing device (e.g., touch-pad, mouse) and may be used to provide inputs (e.g., for providing inputs to the user interfaces of FIGS. 4A and 4B). Network interface 780 provides connectivity to a network (e.g., using Internet Protocol), and may be used to communicate with other systems (of FIG. 1) connected to the networks (120).

Secondary memory 730 may contain hard drive 735, flash memory 736, and removable storage drive 737. Secondary memory 730 may store the data (for example, data portions shown in FIGS. 5A-5D) and software instructions (for example, for implementing the various features of the present disclosure as shown in FIG. 3, etc.), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX A

```
1:   {
2:     "spec": {
3:       "name": " LAMP ",
4:       "_comment": "Name of Blueprint",
5:       "resources": {
6:         "type": "USER",
7:         "app_profile_list": [
8:           {
9:             "name": "Nutanix",
10:            "_comment": "Profile Nutanix",
11:            "deployment_create_list": [
12:              {
13:                "variable_list": [],
14:                "action_list": [],
15:                "min_replicas": "1",
16:                "name": "cbc66a9b_deployment",
17:                "max_replicas": "1",
18:                "substrate_local_reference": {
19:                  "kind": "app_substrate",
20:                  "name": " MYSQL_NUTANIX_VM ",
21:                  "uuid": "fd86a4f6-15bf-45a6-af91-8830bf68e30a"
22:                },
23:                "type": "GREENFIELD",
24:                "uuid": "2b27241f-86dc-43ff-bc52-cfc13e634a10",
25:                "description": "",
26:                "package_local_reference_list": [
27:                  {
28:                    "kind": "app_package",
29:                    "name": "MYSQL_PACKAGE",
30:                    "uuid": "3efd7315-727d-4b26-9420-4e8bf92d2e8a"
31:                  }
32:                ]
33:              },
34:              {
35:                "variable_list": [],
36:                "action_list": [],
37:                "min_replicas": "2",
38:                "name": "7df0cc1c_deployment",
39:                "editables": {
40:                  "min_replicas": true,
41:                  "max_replicas": true
42:                },
43:                "max_replicas": "2",
44:                "substrate_local_reference": {
45:                  "kind": "app_substrate",
```

```
46:        "name": " APACHE_PHP_NUTANIX_VM ",
47:        "uuid": "f32cf0a2-134a-46e6-aff5-fd2eb7fed2aa"
48:      },
49:      "type": "GREENFIELD",
50:      "uuid": "17aa5949-2671-48f7-b8a4-f8e7ed6b9dc2",
51:      "description": "",
52:      "package_local_reference_list": [
53:        {
54:          "kind": "app_package",
55:          "name": "APACHE_PHP_PACKAGE",
56:          "uuid": "d480c76e-0410-4210-a33c-f17b5a0a3dff"
57:        }
58:      ]
59:    },
60:    {
61:      "variable_list": [],
62:      "action_list": [],
63:      "min_replicas": "1",
64:      "name": "4d96f2c3_deployment",
65:      "max_replicas": "1",
66:      "substrate_local_reference": {
67:        "kind": "app_substrate",
68:        "name": " NGINX_NUTANIX_VM ",
69:        "_comment": " NGNIX instead of HAProxy on Nutanix",
70:        "uuid": "42dea965-45cb-4c18-88fa-b4250ec6e991"
71:      },
72:      "type": "GREENFIELD",
73:      "uuid": "0fa199b6-5ebd-4fa5-a1da-3efef3713adc",
74:      "description": "",
75:      "package_local_reference_list": [
76:        {
77:          "kind": "app_package",
78:          "name": "NGINX_PACKAGE",
79:          "uuid": "0f766feb-54c6-4664-b01a-71a50f74dbf6"
80:        }
81:      ]
82:    },
83:    {
84:      "variable_list": [],
85:      "action_list": [],
86:      "min_replicas": "1",
87:      "name": "4d96f2c4_deployment",
88:      "max_replicas": "1",
89:      "substrate_local_reference": {
90:        "kind": "app_substrate",
91:        "name": " MONDRIAN_OLAP_NUTANIX_VM ",
```

```
 92:         "uuid": "42dea965-45cb-4c18-88fa-b4250ec6e992"
 93:       },
 94:       "type": "GREENFIELD",
 95:       "uuid": "0fa199b6-5ebd-4fa5-a1da-3efef3713add",
 96:       "description": "",
 97:       "package_local_reference_list": [
 98:         {
 99:           "kind": "app_package",
100:           "name": "MONDRIAN_OLAP_PACKAGE_NUTANIX",
101:           "uuid": "0f766feb-54c6-4664-b01a-71a50f74dbf7"
102:         }
103:       ]
104:     }
105:   ],
106:   "description": "",
107:   "action_list": [
108:     5
109:   ],
110:   "variable_list": [
111:     {
112:       "attrs": {
113:         "type": ""
114:       },
115:       "name": "INSTANCE_PUBLIC_KEY",
116:       "editables": {
117:         "value": true
118:       },
119:       "value": "ssh-rsa ...centos@nutanix.com",
120:       "label": "",
121:       "val_type": "STRING",
122:       "type": "LOCAL",
123:       "uuid": "6b52c41d-8cf1-427a-8875-b4430e16b014",
124:       "description": ""
125:     },
126:     {
127:       "attrs": {
128:         "is_secret_modified": false,
129:         "secret_reference": {
130:           "uuid": "67dd8a81-ab70-4481-8bca-f32f7d7ba953"
131:         }
132:       },
133:       "name": "MYSQL_PASSWORD",
134:       "editables": {
135:         "value": true
136:       },
137:       "label": "",
```

```
138:          "val_type": "STRING",
139:          "type": "SECRET",
140:          "uuid": "2bc82889-df67-4e38-9aa2-d875755a7b30",
141:          "description": ""
142:        }
143:     ],
144:     "uuid": "36eafcfd-2475-4721-b72d-d161bb493b06"
145:   },
146:   {
147:     "name": "AWS",
148:     "_comment": "Profile AWS",
149:     "deployment_create_list": [
150:       {
151:         "variable_list": [],
152:         "action_list": [],
153:         "min_replicas": "1",
154:         "name": "82497149_deployment",
155:         "max_replicas": "1",
156:         "substrate_local_reference": {
157:           "kind": "app_substrate",
158:           "name": " MYSQL_AWS ",
159:           "uuid": "397d92af-2971-4f7b-9500-590e3e2c2821"
160:         },
161:         "type": "GREENFIELD",
162:         "uuid": "f85660ad-4807-4ede-88cc-2f3a855aba60",
163:         "description": "",
164:         "package_local_reference_list": [
165:           {
166:             "kind": "app_package",
167:             "name": "MYSQL_AWS_Package",
168:             "uuid": "76473418-1402-420e-8f86-90ebc0898150"
169:           }
170:         ]
171:       },
172:       {
173:         "variable_list": [],
174:         "action_list": [],
175:         "min_replicas": "2",
176:         "name": "993cee9f_deployment",
177:         "editables": {
178:           "min_replicas": true,
179:           "max_replicas": true
180:         },
181:         "max_replicas": "2",
182:         "substrate_local_reference": {
183:           "kind": "app_substrate",
```

```
184:            "name": " APACHE_PHP_AWS ",
185:            "uuid": "214314e5-4d92-44ac-b82d-add28710081e"
186:          },
187:          "type": "GREENFIELD",
188:          "uuid": "8859be17-c455-4277-8b70-57fc3f16209a",
189:          "description": "",
190:          "package_local_reference_list": [
191:            {
192:              "kind": "app_package",
193:              "name": "APACHE_PHP_Package",
194:              "uuid": "39825c6b-9e4b-452e-84bd-b8af1fc01244"
195:            }
196:          ]
197:        },
198:        {
199:          "variable_list": [],
200:          "action_list": [],
201:          "min_replicas": "1",
202:          "name": "a5669618_deployment",
203:          "max_replicas": "1",
204:          "substrate_local_reference": {
205:            "kind": "app_substrate",
206:            "name": " HAPROXY_AWS ",
207:            "uuid": "4777f91f-bd07-49eb-9466-d76db42189bb"
208:          },
209:          "type": "GREENFIELD",
210:          "uuid": "509c0e8b-0ebe-4f4d-858a-7b37191d5d50",
211:          "description": "",
212:          "package_local_reference_list": [
213:            {
214:              "kind": "app_package",
215:              "name": "HAPROXY_AWS_Package",
216:              "uuid": "b6b928cc-807b-4c10-a05e-8d17ddf0218f"
217:            }
218:          ]
219:        }
220:      ],
221:      "description": "",
222:      "action_list": [
223:        5
224:      ],
225:      "variable_list": [
226:        {
227:          "attrs": {
228:            "is_secret_modified": false,
229:            "secret_reference": {
```

```
230:           "uuid": "38a99594-4f38-4ecc-8cd2-7f7ee805a6c9"
231:         }
232:       },
233:       "name": "MYSQL_PASSWORD",
234:       "editables": {
235:         "value": true
236:       },
237:       "label": "",
238:       "val_type": "STRING",
239:       "type": "SECRET",
240:       "uuid": "0c5b63ce-8b49-432a-8907-7120093947a1",
241:       "description": ""
242:     }
243:   ],
244:   "uuid": "14846c5a-c57b-4f17-affc-c22fd4221f84"
245: }
246: ],
247: "package_definition_list": [
248:   {
249:     "variable_list": [],
250:     "action_list": [],
251:     "name": "MYSQL_PACKAGE",
252:     "service_local_reference_list": [
253:       {
254:         "kind": "app_service",
255:         "name": "MYSQL",
256:         "uuid": "31db299a-9cc3-4fdc-8895-f5d44b24b14d"
257:       }
258:     ],
259:     "version": "",
260:     "type": "DEB",
261:     "uuid": "3efd7315-727d-4b26-9420-4e8bf92d2e8a",
262:     "description": "",
263:     "options": {
264:       "install_runbook": {
265:         "variable_list": [],
266:         "main_task_local_reference": {
267:           "kind": "app_task",
268:           "name": "696811b8_dag",
269:           "uuid": "ee80b36c-a77e-4ab4-8428-eae0538adb77"
270:         },
271:         "name": "fa139f70_runbook",
272:         "task_definition_list": [
273:           {
274:             "timeout_secs": "0",
275:             "variable_list": [],
```

```
276:            "retries": "0",
277:            "name": "696811b8_dag",
278:            "state": "ACTIVE",
279:            "message_list": [],
280:            "target_any_local_reference": {
281:              "kind": "app_package",
282:              "name": "MYSQL_PACKAGE",
283:              "uuid": "3efd7315-727d-4b26-9420-4e8bf92d2e8a"
284:            },
285:            "child_tasks_local_reference_list": [
286:              {
287:                "kind": "app_task",
288:                "name": "PackageInstallTask",
289:                "uuid": "31cb94c3-f732-4fbf-a77a-c65beea6e40b"
290:              }
291:            ],
292:            "type": "DAG",
293:            "uuid": "ee80b36c-a77e-4ab4-8428-eae0538adb77",
294:            "description": ""
295:          },
296:          {
297:            "timeout_secs": "0",
298:            "variable_list": [],
299:            "retries": "0",
300:            "name": "PackageInstallTask",
301:            "state": "ACTIVE",
302:            "message_list": [],
303:            "target_any_local_reference": {
304:              "kind": "app_package",
305:              "name": "MYSQL_PACKAGE",
306:              "uuid": "3efd7315-727d-4b26-9420-4e8bf92d2e8a"
307:            },
308:            "child_tasks_local_reference_list": [],
309:            "attrs": {
310:              "script": "#!/bin/bashnset -exnn# -*- Mysql installation nsudo yum install -y \"http://repo.mysql.com/mysql-community-release-el7.rpm\"\nsudo yum update -ynsudo yum install -y mysql-community-server.x86_64\nsudo systemctl start mysqldnsudo systemctl enable mysqldnn# -*- Mysql secure installationnmysql -u root<<-EOFnUPDATE mysql.user SET Password=PASSWORD('@@{MYSQL_PASSWORD}@@') WHERE User='root';\nDELETE FROM mysql.user WHERE User='root' AND Host NOT IN ('localhost', '127.0.0.1', '::1');\nDELETE FROM mysql.user WHERE User='';\nDELETE FROM mysql.db WHERE Db='test' OR Db='test\\_%';\nFLUSH PRIVILEGES;\nEOF\n",
311:              "type": "",
312:              "command_line_args": "",
313:              "exit_status": [],
314:              "script_type": "sh"
```

```
315:        },
316:        "type": "EXEC",
317:        "uuid": "31cb94c3-f732-4fbf-a77a-c65beea6e40b",
318:        "description": ""
319:      }
320:    ],
321:    "state": "ACTIVE",
322:    "message_list": [],
323:    "uuid": "f144880f-5dcf-45fc-8a67-812ef2969cc7",
324:    "description": ""
325:  },
326:  "type": "",
327:  "uninstall_runbook": {
328:    "variable_list": [],
329:    "main_task_local_reference": {
330:      "kind": "app_task",
331:      "name": "9f5b6937_dag",
332:      "uuid": "487cec10-c7ba-4c94-997e-a9bef679d6f7"
333:    },
334:    "name": "add53bd1_runbook",
335:    "task_definition_list": [
336:      {
337:        "timeout_secs": "0",
338:        "variable_list": [],
339:        "attrs": {
340:          "edges": [],
341:          "type": ""
342:        },
343:        "retries": "0",
344:        "name": "9f5b6937_dag",
345:        "state": "ACTIVE",
346:        "message_list": [],
347:        "target_any_local_reference": {
348:          "kind": "app_package",
349:          "name": "MYSQL_PACKAGE",
350:          "uuid": "3efd7315-727d-4b26-9420-4e8bf92d2e8a"
351:        },
352:        "child_tasks_local_reference_list": [],
353:        "type": "DAG",
354:        "uuid": "487cec10-c7ba-4c94-997e-a9bef679d6f7",
355:        "description": ""
356:      }
357:    ],
358:    "state": "ACTIVE",
359:    "message_list": [],
360:    "uuid": "ff13b839-8261-4548-b696-37f2df1f6066",
```

```
361:        "description": ""
362:      }
363:    }
364:  },
365:  {
366:    "variable_list": [],
367:    "action_list": [],
368:    "name": "APACHE_PHP_PACKAGE",
369:    "service_local_reference_list": [
370:      {
371:        "kind": "app_service",
372:        "name": "APACHE_PHP",
373:        "uuid": "7db81d1d-bd1f-4424-bd5c-03f432a8e47b"
374:      }
375:    ],
376:    "version": "",
377:    "type": "DEB",
378:    "uuid": "d480c76e-0410-4210-a33c-f17b5a0a3dff",
379:    "description": "",
380:    "options": {
381:      "install_runbook": {
382:        "variable_list": [],
383:        "main_task_local_reference": {
384:          "kind": "app_task",
385:          "name": "27550204_dag",
386:          "uuid": "b8815684-2b57-4186-b2b2-7bd8451f450b"
387:        },
388:        "name": "124852e5_runbook",
389:        "task_definition_list": [
390:          {
391:            "timeout_secs": "0",
392:            "variable_list": [],
393:            "retries": "0",
394:            "name": "27550204_dag",
395:            "state": "ACTIVE",
396:            "message_list": [],
397:            "target_any_local_reference": {
398:              "kind": "app_package",
399:              "name": "APACHE_PHP_PACKAGE",
400:              "uuid": "d480c76e-0410-4210-a33c-f17b5a0a3dff"
401:            },
402:            "child_tasks_local_reference_list": [
403:              {
404:                "kind": "app_task",
405:                "name": "PackageInstallTask",
406:                "uuid": "7c58cf42-f044-40cc-ad63-6b7bceadb030"
```

```
407:            }
408:          ],
409:          "type": "DAG",
410:          "uuid": "b8815684-2b57-4186-b2b2-7bd8451f450b",
411:          "description": ""
412:        },
413:        {
414:          "timeout_secs": "0",
415:          "variable_list": [],
416:          "retries": "0",
417:          "name": "PackageInstallTask",
418:          "state": "ACTIVE",
419:          "message_list": [],
420:          "target_any_local_reference": {
421:            "kind": "app_package",
422:            "name": "APACHE_PHP_PACKAGE",
423:            "uuid": "d480c76e-0410-4210-a33c-f17b5a0a3dff"
424:          },
425:          "child_tasks_local_reference_list": [],
426:          "attrs": {
427:              "script": "#!/bin/bash\nset -ex\n# -*- Install httpd and php\nsudo yum update-y \nsudo yum -y install epel-release\nsudo rpm -Uvh https://mirror.webtatic.com/yum/el7/webtatic-release.rpm\nsudo yum install -y httpd php56w php56w-mysql\n\necho \"<IfModule mod_dir.c>\n DirectoryIndex index.php index.html index.cgi index.pl index.php index.xhtml index.htm\n</IfModule>\" | sudo tee /etc/httpd/conf.modules.d/dir.conf\n\necho \"<?php\nphpinfo();\n?>\" | sudo tee /var/www/html/info.php \nsudo systemctl restart httpd\nsudo systemctl enable httpd",
428:              "type": "",
429:              "command_line_args": "",
430:              "exit_status": [],
431:              "script_type": "sh"
432:          },
433:          "type": "EXEC",
434:          "uuid": "7c58cf42-f044-40cc-ad63-6b7bceadb030",
435:          "description": ""
436:        }
437:      ],
438:      "state": "ACTIVE",
439:      "message_list": [],
440:      "uuid": "67134702-2b03-4541-9f87-87de7b687bbd",
441:      "description": ""
442:    },
443:    "type": "",
444:    "uninstall_runbook": {
445:      "variable_list": [],
446:      "main_task_local_reference": {
```

```
447:          "kind": "app_task",
448:          "name": "11c3b039_dag",
449:          "uuid": "58b24acc-51c8-4eab-889b-971312b7070f"
450:        },
451:        "name": "afe7faff_runbook",
452:        "task_definition_list": [
453:          {
454:            "timeout_secs": "0",
455:            "variable_list": [],
456:            "attrs": {
457:              "edges": [],
458:              "type": ""
459:            },
460:            "retries": "0",
461:            "name": "11c3b039_dag",
462:            "state": "ACTIVE",
463:            "message_list": [],
464:            "target_any_local_reference": {
465:              "kind": "app_package",
466:              "name": "APACHE_PHP_PACKAGE",
467:              "uuid": "d480c76e-0410-4210-a33c-f17b5a0a3dff"
468:            },
469:            "child_tasks_local_reference_list": [],
470:            "type": "DAG",
471:            "uuid": "58b24acc-51c8-4eab-889b-971312b7070f",
472:            "description": ""
473:          }
474:        ],
475:        "state": "ACTIVE",
476:        "message_list": [],
477:        "uuid": "2b55b471-c6b8-4c43-954c-0fd3dbfbf4a9",
478:        "description": ""
479:      }
480:    }
481:  },
482:  {
483:    "variable_list": [],
484:    "action_list": [],
485:    "name": "NGINX_PACKAGE",
486:    "service_local_reference_list": [
487:      {
488:        "kind": "app_service",
489:        "name": "HAPROXY",
490:        "uuid": "cf673061-d9df-4b92-aa88-8925156f5171"
491:      }
492:    ],
```

```
493:        "version": "",
494:        "type": "DEB",
495:        "uuid": "0f766feb-54c6-4664-b01a-71a50f74dbf6",
496:        "description": "",
497:        "options": {
498:          "install_runbook": {
499:            "variable_list": [],
500:            "main_task_local_reference": {
501:              "kind": "app_task",
502:              "name": "feefd61c_dag",
503:              "uuid": "7bbf924d-a120-4565-9028-8d7518169008"
504:            },
505:            "name": "0f3b1d56_runbook",
506:            "task_definition_list": [
507:              {
508:                "timeout_secs": "0",
509:                "variable_list": [],
510:                "retries": "0",
511:                "name": "feefd61c_dag",
512:                "state": "ACTIVE",
513:                "message_list": [],
514:                "target_any_local_reference": {
515:                  "kind": "app_package",
516:                  "name": "HAPROXY_PACKAGE",
517:                  "uuid": "0f766feb-54c6-4664-b01a-71a50f74dbf6"
518:                },
519:                "child_tasks_local_reference_list": [
520:                  {
521:                    "kind": "app_task",
522:                    "name": "PackageInstallTask",
523:                    "uuid": "f0cd89b1-55b6-4f4c-844b-56ad5408ca97"
524:                  }
525:                ],
526:                "type": "DAG",
527:                "uuid": "7bbf924d-a120-4565-9028-8d7518169008",
528:                "description": ""
529:              },
530:              {
531:                "timeout_secs": "0",
532:                "variable_list": [],
533:                "retries": "0",
534:                "name": "PackageInstallTask",
535:                "state": "ACTIVE",
536:                "message_list": [],
537:                "target_any_local_reference": {
538:                  "kind": "app_package",
```

```
539:              "name": "HAPROXY_PACKAGE",
540:              "uuid": "0f766feb-54c6-4664-b01a-71a50f74dbf6"
541:            },
542:          "child_tasks_local_reference_list": [],
543:          "attrs": {
544:              "script": "#!/bin/bash\nset -ex\n\nsudo setenforce 0\nsudo sed -i 's/permissive/disabled/' /etc/sysconfig/selinux\n\nport=80\nsudo yum update -y\nsudo yum install -y haproxy\n\necho \"global\n log 127.0.0.1 local0\n log 127.0.0.1 local1 notice\n maxconn 4096\n quiet\n user haproxy\n group haproxy\ndefaults\n log global\n mode http\n retries 3\n timeout client 50s\n timeout connect 5s\n timeout server 50s\n option dontlognull\n option httplog\n option redispatch\n balance roundrobin\n# Set up application listeners here.\nlisten stats 0.0.0.0:8080\n mode http\n log global\n stats enable\n stats hide-version\n stats refresh 30s\n stats show-node\n stats uri /stats\nlisten admin\n bind 127.0.0.1:22002\n mode http\n stats uri /\nfrontend http\n maxconn 2000\n bind 0.0.0.0:80\n default_backend servers-http\nbackend servers-http\" | sudo tee /etc/haproxy/haproxy.cfg\n\nsudo sed -i 's/server host-/#server host-/g' /etc/haproxy/haproxy.cfg\n\nhosts=$(echo \"@@{APACHE_PHP.address}@@\" | sed 's/^,//' | service sed 's/,$//' | tr \",\" \"\\n\")\n\n\nfor host in $hosts\ndo\n echo \" server host-${host} ${host}:${port} weight 1 maxconn 100 check\" | sudo tee -a /etc/haproxy/haproxy.cfg\ndone\n\nsudo systemctl daemon-reload\nsudo systemctl enable haproxy\nsudo systemctl restart haproxy\n",
545:              "type": "",
546:              "command_line_args": "",
547:              "exit_status": [],
548:              "script_type": "sh"
549:            },
550:          "type": "EXEC",
551:          "uuid": "f0cd89b1-55b6-4f4c-844b-56ad5408ca97",
552:          "description": ""
553:          }
554:        ],
555:        "state": "ACTIVE",
556:        "message_list": [],
557:        "uuid": "28518360-0179-4edb-987d-7ad9e62b0100",
558:        "description": ""
559:      },
560:      "type": "",
561:      "uninstall_runbook": {
562:        "variable_list": [],
563:        "main_task_local_reference": {
564:          "kind": "app_task",
565:          "name": "b0165015_dag",
566:          "uuid": "fedc0475-e9dd-402f-a717-125eaf6ec2d0"
567:        },
568:        "name": "77f817b9_runbook",
569:        "task_definition_list": [
570:          {
```

```
571:            "timeout_secs": "0",
572:            "variable_list": [],
573:            "retries": "0",
574:            "name": "b0165015_dag",
575:            "state": "ACTIVE",
576:            "message_list": [],
577:            "target_any_local_reference": {
578:              "kind": "app_package",
579:              "name": "HAPROXY_PACKAGE",
580:              "uuid": "0f766feb-54c6-4664-b01a-71a50f74dbf6"
581:            },
582:            "child_tasks_local_reference_list": [],
583:            "type": "DAG",
584:            "uuid": "fedc0475-e9dd-402f-a717-125eaf6ec2d0",
585:            "description": ""
586:          }
587:        ],
588:        "state": "ACTIVE",
589:        "message_list": [],
590:        "uuid": "f2f19117-683c-4de0-8049-99c005a1a3cc",
591:        "description": ""
592:      }
593:    }
594:  },
595:  {
596:    "variable_list": [],
597:    "action_list": [],
598:    "name": "MONDRIAN_OLAP_PACKAGE_NUTANIX",
599:    "service_local_reference_list": [
600:      {
601:        "kind": "app_service",
602:        "name": "MONDRIAN_OLAP_NUTANIX",
603:        "uuid": "cf673061-d9df-4b92-aa88-8925156f5173"
604:      }
605:    ],
606:    "version": "",
607:    "type": "DEB",
608:    "uuid": "0f766feb-54c6-4664-b01a-71a50f74dbf7",
609:    "description": "",
610:    "options": {
611:      "install_runbook": {
612:        "variable_list": [],
613:        "main_task_local_reference": {
614:          "kind": "app_task",
615:          "name": "3df06c17_dag",
616:          "uuid": "46a6a130-af42-4797-8b25-f77c2a1ef04d"
```

```
617:          },
618:          "name": "6ae7ec47_runbook",
619:          "task_definition_list": [
620:            {
621:              "timeout_secs": "0",
622:              "variable_list": [],
623:              "retries": "0",
624:              "name": "3df06c17_dag",
625:              "state": "ACTIVE",
626:              "message_list": [],
627:              "target_any_local_reference": {
628:                "kind": "app_package",
629:                "name": "MYSQL_AWS_Package",
630:                "uuid": "76473418-1402-420e-8f86-90ebc0898150"
631:              },
632:              "child_tasks_local_reference_list": [
633:                {
634:                  "kind": "app_task",
635:                  "name": "PackageInstallTask",
636:                  "uuid": "88884ff8-db55-4cda-a928-2d92170332a5"
637:                }
638:              ],
639:              "type": "DAG",
640:              "uuid": "46a6a130-af42-4797-8b25-f77c2a1ef04d",
641:              "description": ""
642:            },
643:            {
644:              "timeout_secs": "0",
645:              "variable_list": [],
646:              "retries": "0",
647:              "name": "PackageInstallTask",
648:              "state": "ACTIVE",
649:              "message_list": [],
650:              "target_any_local_reference": {
651:                "kind": "app_package",
652:                "name": "MYSQL_AWS_Package",
653:                "uuid": "76473418-1402-420e-8f86-90ebc0898150"
654:              },
655:              "child_tasks_local_reference_list": [],
656:              "attrs": {
657:                "script": "#!/bin/bash\nset -ex\n\n# -*- Mysql installation \nsudo yum install -y \"http://repo.mysql.com/mysql-community-release-el7.rpm\"\nsudo yum update -y\nsudo yum install -y mysql-community-server.x86_64\nsudo systemctl start mysqld\nsudo systemctl enable mysqld\n\n# -*- Mysql secure installation\nmysql -u root<<-EOF\nUPDATE mysql.user SET Password=PASSWORD('@@{MYSQL_PASSWORD}@@') WHERE User='root';\nDELETE FROM mysql.user WHERE User='root' AND Host NOT IN ('localhost',
```

```
'127.0.0.1', '::1');\nDELETE FROM mysql.user WHERE User='';\nDELETE FROM mysql.db
WHERE Db='test' OR Db='test\\_%';\nFLUSH PRIVILEGES;\nEOF\n",
658:                    "type": "",
659:                    "command_line_args": "",
660:                    "exit_status": [],
661:                    "script_type": "sh"
662:                  },
663:                  "type": "EXEC",
664:                  "uuid": "88884ff8-db55-4cda-a928-2d92170332a5",
665:                  "description": ""
666:                }
667:              ],
668:              "state": "ACTIVE",
669:              "message_list": [],
670:              "uuid": "0d42276d-e793-4d5a-86fb-26d83d08dc82",
671:              "description": ""
672:            },
673:            "type": "",
674:            "uninstall_runbook": {
675:              "variable_list": [],
676:              "main_task_local_reference": {
677:                "kind": "app_task",
678:                "name": "fbda6fa8_dag",
679:                "uuid": "3abcf988-7f77-46cf-88af-81b1da6644df"
680:              },
681:              "name": "c10cbc75_runbook",
682:              "task_definition_list": [
683:                {
684:                  "timeout_secs": "0",
685:                  "variable_list": [],
686:                  "retries": "0",
687:                  "name": "fbda6fa8_dag",
688:                  "state": "ACTIVE",
689:                  "message_list": [],
690:                  "target_any_local_reference": {
691:                    "kind": "app_package",
692:                    "name": "MYSQL_AWS_Package",
693:                    "uuid": "76473418-1402-420e-8f86-90ebc0898150"
694:                  },
695:                  "child_tasks_local_reference_list": [],
696:                  "type": "DAG",
697:                  "uuid": "3abcf988-7f77-46cf-88af-81b1da6644df",
698:                  "description": ""
699:                }
700:              ],
701:              "state": "ACTIVE",
```

```
702:        "message_list": [],
703:        "uuid": "b6b0f0e0-9811-42d7-938c-cdf1ab9731f0",
704:        "description": ""
705:       }
706:      }
707:     },
708:     {
709:      "variable_list": [],
710:      "action_list": [],
711:      "name": "MYSQL_AWS_Package",
712:      "service_local_reference_list": [
713:       {
714:        "kind": "app_service",
715:        "name": "MYSQL",
716:        "uuid": "31db299a-9cc3-4fdc-8895-f5d44b24b14d"
717:       }
718:      ],
719:      "version": "",
720:      "type": "DEB",
721:      "uuid": "76473418-1402-420e-8f86-90ebc0898150",
722:      "description": "",
723:      "options": {
724:       "install_runbook": {
725:        "variable_list": [],
726:        "main_task_local_reference": {
727:         "kind": "app_task",
728:         "name": "3df06c17_dag",
729:         "uuid": "46a6a130-af42-4797-8b25-f77c2a1ef04d"
730:        },
731:        "name": "6ae7ec47_runbook",
732:        "task_definition_list": [
733:         {
734:          "timeout_secs": "0",
735:          "variable_list": [],
736:          "retries": "0",
737:          "name": "3df06c17_dag",
738:          "state": "ACTIVE",
739:          "message_list": [],
740:          "target_any_local_reference": {
741:           "kind": "app_package",
742:           "name": "MYSQL_AWS_Package",
743:           "uuid": "76473418-1402-420e-8f86-90ebc0898150"
744:          },
745:          "child_tasks_local_reference_list": [
746:           {
747:            "kind": "app_task",
```

```
748:            "name": "PackageInstallTask",
749:            "uuid": "88884ff8-db55-4cda-a928-2d92170332a5"
750:          }
751:        ],
752:        "type": "DAG",
753:        "uuid": "46a6a130-af42-4797-8b25-f77c2a1ef04d",
754:        "description": ""
755:      },
756:      {
757:        "timeout_secs": "0",
758:        "variable_list": [],
759:        "retries": "0",
760:        "name": "PackageInstallTask",
761:        "state": "ACTIVE",
762:        "message_list": [],
763:        "target_any_local_reference": {
764:          "kind": "app_package",
765:          "name": "MYSQL_AWS_Package",
766:          "uuid": "76473418-1402-420e-8f86-90ebc0898150"
767:        },
768:        "child_tasks_local_reference_list": [],
769:        "type": "EXEC",
770:        "uuid": "88884ff8-db55-4cda-a928-2d92170332a5",
771:        "description": ""
772:      }
773:    ],
774:    "state": "ACTIVE",
775:    "message_list": [],
776:    "uuid": "0d42276d-e793-4d5a-86fb-26d83d08dc82",
777:    "description": ""
778:  },
779:  "type": "",
780:  "uninstall_runbook": {
781:    "variable_list": [],
782:    "main_task_local_reference": {
783:      "kind": "app_task",
784:      "name": "fbda6fa8_dag",
785:      "uuid": "3abcf988-7f77-46cf-88af-81b1da6644df"
786:    },
787:    "name": "c10cbc75_runbook",
788:    "task_definition_list": [
789:      {
790:        "timeout_secs": "0",
791:        "variable_list": [],
792:        "attrs": {
793:          "edges": [],
```

```
794:            "type": ""
795:          },
796:          "retries": "0",
797:          "name": "fbda6fa8_dag",
798:          "state": "ACTIVE",
799:          "message_list": [],
800:          "target_any_local_reference": {
801:            "kind": "app_package",
802:            "name": "MYSQL_AWS_Package",
803:            "uuid": "76473418-1402-420e-8f86-90ebc0898150"
804:          },
805:          "child_tasks_local_reference_list": [],
806:          "type": "DAG",
807:          "uuid": "3abcf988-7f77-46cf-88af-81b1da6644df",
808:          "description": ""
809:        }
810:      ],
811:      "state": "ACTIVE",
812:      "message_list": [],
813:      "uuid": "b6b0f0e0-9811-42d7-938c-cdf1ab9731f0",
814:      "description": ""
815:    }
816:  }
817: },
818: {
819:   "variable_list": [],
820:   "action_list": [],
821:   "name": "APACHE_PHP_Package",
822:   "service_local_reference_list": [
823:     {
824:       "kind": "app_service",
825:       "name": "APACHE_PHP",
826:       "uuid": "7db81d1d-bd1f-4424-bd5c-03f432a8e47b"
827:     }
828:   ],
829:   "version": "",
830:   "type": "DEB",
831:   "uuid": "39825c6b-9e4b-452e-84bd-b8af1fc01244",
832:   "description": "",
833:   "options": {
834:     "install_runbook": {
835:       "variable_list": [],
836:       "main_task_local_reference": {
837:         "kind": "app_task",
838:         "name": "d6e5dc65_dag",
839:         "uuid": "ccb88415-9d67-448d-8f3a-522f4f20f67a"
```

```
840:        },
841:        "name": "3fd1c9ab_runbook",
842:        "task_definition_list": [
843:          {
844:            "timeout_secs": "0",
845:            "variable_list": [],
846:            "retries": "0",
847:            "name": "d6e5dc65_dag",
848:            "state": "ACTIVE",
849:            "message_list": [],
850:            "target_any_local_reference": {
851:              "kind": "app_package",
852:              "name": "APACHE_PHP_Package",
853:              "uuid": "39825c6b-9e4b-452e-84bd-b8af1fc01244"
854:            },
855:            "child_tasks_local_reference_list": [
856:              {
857:                "kind": "app_task",
858:                "name": "PackageInstallTask",
859:                "uuid": "845b2423-c10f-47db-923a-4fa1fb2bf176"
860:              }
861:            ],
862:            "type": "DAG",
863:            "uuid": "ccb88415-9d67-448d-8f3a-522f4f20f67a",
864:            "description": ""
865:          },
866:          {
867:            "timeout_secs": "0",
868:            "variable_list": [],
869:            "retries": "0",
870:            "name": "PackageInstallTask",
871:            "state": "ACTIVE",
872:            "message_list": [],
873:            "target_any_local_reference": {
874:              "kind": "app_package",
875:              "name": "APACHE_PHP_Package",
876:              "uuid": "39825c6b-9e4b-452e-84bd-b8af1fc01244"
877:            },
878:            "child_tasks_local_reference_list": [],
879:            "attrs": {
880:              "script": "#!/bin/bash\nset -ex\n# -*- Install httpd and php\nsudo yum update-y\nsudo yum -y install epel-release\nsudo rpm -Uvh https://mirror.webtatic.com/yum/el7/webtatic-release.rpm\nsudo yum install -y httpd php56w php56w-mysql\n\necho \"<IfModule mod_dir.c>\n DirectoryIndex index.php index.html index.cgi index.pl index.php index.xhtml index.htm\n</IfModule>\" | sudo tee /etc/httpd/conf.modules.d/dir.conf\n\necho \"<?php\nphpinfo();\n?>\" | sudo tee
```

```
         /var/www/html/info.php \nsudo systemctl restart httpd\nsudo systemctl enable httpd",
881:                   "type": "",
882:                   "command_line_args": "",
883:                   "exit_status": [],
884:                   "script_type": "sh"
885:                 },
886:              "type": "EXEC",
887:              "uuid": "845b2423-c10f-47db-923a-4fa1fb2bf176",
888:              "description": ""
889:             }
890:           ],
891:           "state": "ACTIVE",
892:           "message_list": [],
893:           "uuid": "3d322b1e-d45a-4936-91d6-172d012cf66e",
894:           "description": ""
895:         },
896:       "type": "",
897:       "uninstall_runbook": {
898:         "variable_list": [],
899:         "main_task_local_reference": {
900:           "kind": "app_task",
901:           "name": "51071c75_dag",
902:           "uuid": "8d616c49-4f30-43af-b99a-162e95795cc1"
903:         },
904:         "name": "f5a30f7d_runbook",
905:         "task_definition_list": [
906:           {
907:             "timeout_secs": "0",
908:             "variable_list": [],
909:             "attrs": {
910:               "edges": [],
911:               "type": ""
912:             },
913:             "retries": "0",
914:             "name": "51071c75_dag",
915:             "state": "ACTIVE",
916:             "message_list": [],
917:             "target_any_local_reference": {
918:               "kind": "app_package",
919:               "name": "APACHE_PHP_Package",
920:               "uuid": "39825c6b-9e4b-452e-84bd-b8af1fc01244"
921:             },
922:             "child_tasks_local_reference_list": [],
923:             "type": "DAG",
924:             "uuid": "8d616c49-4f30-43af-b99a-162e95795cc1",
925:             "description": ""
```

```
926:              }
927:            ],
928:            "state": "ACTIVE",
929:            "message_list": [],
930:            "uuid": "b8c57f30-5a75-4f25-abc2-abeb247b3000",
931:            "description": ""
932:          }
933:        }
934:      },
935:      {
936:        "variable_list": [],
937:        "action_list": [],
938:        "name": "HAPROXY_AWS_Package",
939:        "service_local_reference_list": [
940:          {
941:            "kind": "app_service",
942:            "name": "HAPROXY",
943:            "uuid": "cf673061-d9df-4b92-aa88-8925156f5171"
944:          }
945:        ],
946:        "version": "",
947:        "type": "DEB",
948:        "uuid": "b6b928cc-807b-4c10-a05e-8d17ddf0218f",
949:        "description": "",
950:        "options": {
951:          "install_runbook": {
952:            "variable_list": [],
953:            "main_task_local_reference": {
954:              "kind": "app_task",
955:              "name": "77516abd_dag",
956:              "uuid": "5a260ea6-23dd-4976-9466-f8d875a94f7a"
957:            },
958:            "name": "72a1acd3_runbook",
959:            "task_definition_list": [
960:              {
961:                "timeout_secs": "0",
962:                "variable_list": [],
963:                "retries": "0",
964:                "name": "77516abd_dag",
965:                "state": "ACTIVE",
966:                "message_list": [],
967:                "target_any_local_reference": {
968:                  "kind": "app_package",
969:                  "name": "HAPROXY_AWS_Package",
970:                  "uuid": "b6b928cc-807b-4c10-a05e-8d17ddf0218f"
971:                },
```

```
972:              "child_tasks_local_reference_list": [
973:                {
974:                  "kind": "app_task",
975:                  "name": "PackageInstallTask",
976:                  "uuid": "35a31044-2f0c-4947-ae42-d09a3b54e7c5"
977:                }
978:              ],
979:              "type": "DAG",
980:              "uuid": "5a260ea6-23dd-4976-9466-f8d875a94f7a",
981:              "description": ""
982:            },
983:            {
984:              "timeout_secs": "0",
985:              "variable_list": [],
986:              "retries": "0",
987:              "name": "PackageInstallTask",
988:              "state": "ACTIVE",
989:              "message_list": [],
990:              "target_any_local_reference": {
991:                "kind": "app_package",
992:                "name": "HAPROXY_AWS_Package",
993:                "uuid": "b6b928cc-807b-4c10-a05e-8d17ddf0218f"
994:              },
995:              "child_tasks_local_reference_list": [],
996:              "attrs": {
997:                         "script": "#!/bin/bash\nset -ex\n\nsudo setenforce 0\nsudo sed -i 's/permissive/disabled/' /etc/sysconfig/selinux\n\nport=80\nsudo yum update -y\nsudo yum install -y haproxy\n\necho \"global\n log 127.0.0.1 local0\n log 127.0.0.1 local1 notice\n maxconn 4096\n quiet\n user haproxy\n group haproxy\ndefaults\n log global\n mode http\n retries 3\n timeout client 50s\n timeout connect 5s\n timeout server 50s\n option dontlognull\n option httplog\n option redispatch\n balance roundrobin\n# Set up application listeners here.\nlisten stats 0.0.0.0:8080\n mode http\n log global\n stats enable\n stats hide-version\n stats refresh 30s\n stats show-node\n stats uri /stats\nlisten admin\n bind 127.0.0.1:22002\n mode http\n stats uri /\nfrontend http\n maxconn 2000\n bind 0.0.0.0:80\n default_backend servers-http\nbackend servers-http\" | sudo tee /etc/haproxy/haproxy.cfg\n\nsudo sed -i 's/server host-/#server host-/g' /etc/haproxy/haproxy.cfg\n\nhosts=$(echo \"@@{APACHE_PHP.address}@@\" | sed 's/^,//' | sed 's/,$//' | tr \",\" \"\\n\")\n\nfor host in $hosts\ndo\n echo \" server host-${host} ${host}:${port} weight 1 maxconn 100 check\" | sudo tee -a /etc/haproxy/haproxy.cfg\ndone\n\nsudo systemctl daemon-reload\nsudo systemctl enable haproxy\nsudo systemctl restart haproxy\n",
998:                         "type": "",
999:                         "command_line_args": "",
1000:                        "exit_status": [],
1001:                        "script_type": "sh"
1002:              },
1003:              "type": "EXEC",
```

```
1004:            "uuid": "35a31044-2f0c-4947-ae42-d09a3b54e7c5",
1005:            "description": ""
1006:          }
1007:        ],
1008:        "state": "ACTIVE",
1009:        "message_list": [],
1010:        "uuid": "6eb1dad1-91b4-4d71-bc0b-5c6b9179daee",
1011:        "description": ""
1012:      },
1013:      "type": "",
1014:      "uninstall_runbook": {
1015:        "variable_list": [],
1016:        "main_task_local_reference": {
1017:          "kind": "app_task",
1018:          "name": "f107da95_dag",
1019:          "uuid": "4cbfbbd5-7be6-431b-963b-92ce56f2bc35"
1020:        },
1021:        "name": "7693efd6_runbook",
1022:        "task_definition_list": [
1023:          {
1024:            "timeout_secs": "0",
1025:            "variable_list": [],
1026:            "retries": "0",
1027:            "name": "f107da95_dag",
1028:            "state": "ACTIVE",
1029:            "message_list": [],
1030:            "target_any_local_reference": {
1031:              "kind": "app_package",
1032:              "name": "HAPROXY_AWS_Package",
1033:              "uuid": "b6b928cc-807b-4c10-a05e-8d17ddf0218f"
1034:            },
1035:            "child_tasks_local_reference_list": [],
1036:            "type": "DAG",
1037:            "uuid": "4cbfbbd5-7be6-431b-963b-92ce56f2bc35",
1038:            "description": ""
1039:          }
1040:        ],
1041:        "state": "ACTIVE",
1042:        "message_list": [],
1043:        "uuid": "a29284e6-a99e-4854-a010-8e4f1e70db20",
1044:        "description": ""
1045:        }
1046:      }
1047:    }
1048:  ],
1049:  "service_definition_list": [
```

```
1050:    {
1051:      "variable_list": [],
1052:      "tier": "",
1053:      "depends_on_list": [],
1054:      "singleton": false,
1055:      "name": "MYSQL",
1056:      "uuid": "31db299a-9cc3-4fdc-8895-f5d44b24b14d",
1057:      "port_list": [],
1058:      "description": ""
1059:    },
1060:    {
1061:      "variable_list": [],
1062:      "tier": "",
1063:      "depends_on_list": [
1064:        {
1065:          "kind": "app_service",
1066:          "name": "MYSQL",
1067:          "_comment": "Dependency for AWS provider",
1068:          "uuid": "31db299a-9cc3-4fdc-8895-f5d44b24b14d"
1069:        }
1070:      ],
1071:      "singleton": false,
1072:      "name": " APACHE_PHP ",
1073:      "uuid": "7db81d1d-bd1f-4424-bd5c-03f432a8e47b",
1074:      "port_list": [],
1075:      "description": ""
1076:    },
1077:    {
1078:      "variable_list": [],
1079:      "tier": "",
1080:      "depends_on_list": [
1081:        {
1082:          "kind": "app_service",
1083:          "name": " APACHE_PHP ",
1084:          "uuid": "7db81d1d-bd1f-4424-bd5c-03f432a8e47b"
1085:        }
1086:      ],
1087:      "singleton": false,
1088:      "name": " HAPROXY ",
1089:      "uuid": "cf673061-d9df-4b92-aa88-8925156f5171",
1090:      "port_list": [],
1091:      "description": ""
1092:    },
1093:    {
1094:      "variable_list": [],
1095:      "tier": "",
```

```
1096:         "depends_on_list": [],
1097:         "singleton": false,
1098:         "name": "MYSQL_NUTANIX",
1099:         "uuid": "31db299a-9cc3-4fdc-8895-f5d44b24b14e",
1100:         "port_list": [],
1101:         "description": ""
1102:       },
1103:       {
1104:         "variable_list": [],
1105:         "tier": "",
1106:         "depends_on_list": [
1107:           {
1108:             "kind": "app_service",
1109:             "name": " MYSQL_NUTANIX ",
1110:             "_comment": "Dependency for Nutanix provider",
1111:             "uuid": "31db299a-9cc3-4fdc-8895-f5d44b24b14e"
1112:           }
1113:         ],
1114:         "singleton": false,
1115:         "name": " APACHE_PHP_NUTANIX ",
1116:         "uuid": "7db81d1d-bd1f-4424-bd5c-03f432a8e47c",
1117:         "port_list": [],
1118:         "description": ""
1119:       },
1120:       {
1121:         "variable_list": [],
1122:         "tier": "",
1123:         "depends_on_list": [
1124:           {
1125:             "kind": "app_service",
1126:             "name": " APACHE_PHP_NUTANIX ",
1127:             "uuid": "7db81d1d-bd1f-4424-bd5c-03f432a8e47c"
1128:           }
1129:         ],
1130:         "singleton": false,
1131:         "name": " NGINX_NUTANIX ",
1132:         "uuid": "cf673061-d9df-4b92-aa88-8925156f5172",
1133:         "port_list": [],
1134:         "description": ""
1135:       },
1136:       {
1137:         "variable_list": [],
1138:         "tier": "",
1139:         "depends_on_list": [
1140:           {
1141:             "kind": "app_service",
```

```
1142:            "name": " MYSQL_NUTANIX ",
1143:            "uuid": "31db299a-9cc3-4fdc-8895-f5d44b24b14e"
1144:          }
1145:        ],
1146:        "singleton": false,
1147:        "name": " MONDRIAN_OLAP_NUTANIX ",
1148:        "uuid": "cf673061-d9df-4b92-aa88-8925156f5173",
1149:        "port_list": [],
1150:        "description": ""
1151:      }
1152:    ],
1153:    "substrate_definition_list": [
1154:      {
1155:        "variable_list": [],
1156:        "action_list": [],
1157:        "name": "MYSQL_NUTANIX_VM",
1158:        "editables": {
1159:          "readiness_probe": {
1160:            "connection_port": true,
1161:            "timeout_secs": true
1162:          },
1163:          "create_spec": {
1164:            "name": true,
1165:            "resources": {
1166:              "num_vcpus_per_socket": true,
1167:              "num_sockets": true,
1168:              "memory_size_mib": true,
1169:              "boot_config": true,
1170:              "guest_customization": true,
1171:              "disk_list": {},
1172:              "nic_list": {},
1173:              "serial_port_list": {}
1174:            }
1175:          }
1176:        },
1177:        "os_type": "Linux",
1178:        "type": "AHV_VM",
1179:        "readiness_probe": {
1180:          "connection_type": "SSH",
1181:          "retries": "5",
1182:          "disable_readiness_probe": false,
1183:          "timeout_secs": "300",
1184:          "address": "@@{platform.status.resources.nic_list[0].ip_endpoint_list[0].ip}@@",
1185:          "connection_port": 22,
1186:          "login_credential_local_reference": {
```

```
1187:          "kind": "app_credential",
1188:          "name": "CENTOS",
1189:          "uuid": "570b76ad-49ff-41e1-80f1-0063be7a8279"
1190:        }
1191:      },
1192:      "uuid": "fd86a4f6-15bf-45a6-af91-8830bf68e30a",
1193:      "description": ""
1194:    },
1195:    {
1196:      "variable_list": [],
1197:      "action_list": [],
1198:      "name": "APACHE_PHP_NUTANIX_VM",
1199:      "editables": {
1200:        "readiness_probe": {
1201:          "connection_port": true,
1202:          "timeout_secs": true
1203:        },
1204:        "create_spec": {
1205:          "name": true,
1206:          "resources": {
1207:            "num_vcpus_per_socket": true,
1208:            "num_sockets": true,
1209:            "memory_size_mib": true,
1210:            "boot_config": true,
1211:            "guest_customization": true,
1212:            "disk_list": {},
1213:            "nic_list": {},
1214:            "serial_port_list": {}
1215:          }
1216:        }
1217:      },
1218:      "os_type": "Linux",
1219:      "type": "AHV_VM",
1220:      "readiness_probe": {
1221:        "connection_type": "SSH",
1222:        "retries": "5",
1223:        "disable_readiness_probe": false,
1224:        "timeout_secs": "300",
1225:        "address": "@@{platform.status.resources.nic_list[0].ip_endpoint_list[0].ip}@@",
1226:        "connection_port": 22,
1227:        "login_credential_local_reference": {
1228:          "kind": "app_credential",
1229:          "name": "CENTOS",
1230:          "uuid": "570b76ad-49ff-41e1-80f1-0063be7a8279"
1231:        }
```

```
1232:        },
1233:        "uuid": "f32cf0a2-134a-46e6-aff5-fd2eb7fed2aa",
1234:        "description": ""
1235:      },
1236:      {
1237:        "variable_list": [],
1238:        "action_list": [],
1239:        "name": "NGINX_NUTANIX_VM",
1240:        "editables": {
1241:          "readiness_probe": {
1242:            "connection_port": true,
1243:            "timeout_secs": true
1244:          },
1245:          "create_spec": {
1246:            "name": true,
1247:            "resources": {
1248:              "num_vcpus_per_socket": true,
1249:              "num_sockets": true,
1250:              "memory_size_mib": true,
1251:              "boot_config": true,
1252:              "guest_customization": true,
1253:              "disk_list": {},
1254:              "nic_list": {},
1255:              "serial_port_list": {}
1256:            }
1257:          }
1258:        },
1259:        "os_type": "Linux",
1260:        "type": "AHV_VM",
1261:        "readiness_probe": {
1262:          "connection_type": "SSH",
1263:          "retries": "5",
1264:          "disable_readiness_probe": false,
1265:          "timeout_secs": "300",
1266:          "address": "@@{platform.status.resources.nic_list[0].ip_endpoint_list[0].ip}@@",
1267:          "connection_port": 22,
1268:          "login_credential_local_reference": {
1269:            "kind": "app_credential",
1270:            "name": "CENTOS",
1271:            "uuid": "570b76ad-49ff-41e1-80f1-0063be7a8279"
1272:          }
1273:        },
1274:        "uuid": "42dea965-45cb-4c18-88fa-b4250ec6e991",
1275:        "description": ""
1276:      },
```

```
1277:          {
1278:            "variable_list": [],
1279:            "action_list": [],
1280:            "name": "MONDRIAN_OLAP_NUTANIX_VM",
1281:            "editables": {
1282:              "readiness_probe": {
1283:                "connection_port": true,
1284:                "timeout_secs": true
1285:              },
1286:              "create_spec": {
1287:                "name": true,
1288:                "resources": {
1289:                  "num_vcpus_per_socket": true,
1290:                  "num_sockets": true,
1291:                  "memory_size_mib": true,
1292:                  "boot_config": true,
1293:                  "guest_customization": true,
1294:                  "disk_list": {},
1295:                  "nic_list": {},
1296:                  "serial_port_list": {}
1297:                }
1298:              }
1299:            },
1300:            "os_type": "Linux",
1301:            "type": "AHV_VM",
1302:            "readiness_probe": {
1303:              "connection_type": "SSH",
1304:              "retries": "5",
1305:              "disable_readiness_probe": false,
1306:              "timeout_secs": "300",
1307:              "address": "@@{platform.status.resources.nic_list[0].ip_endpoint_list[0].ip}@@",
1308:              "connection_port": 22,
1309:              "login_credential_local_reference": {
1310:                "kind": "app_credential",
1311:                "name": "CENTOS",
1312:                "uuid": "570b76ad-49ff-41e1-80f1-0063be7a8279"
1313:              }
1314:            },
1315:            "uuid": "42dea965-45cb-4c18-88fa-b4250ec6e992",
1316:            "description": ""
1317:          },
1318:          {
1319:            "variable_list": [],
1320:            "action_list": [],
1321:            "name": "MYSQL_AWS",
```

```
1322:        "editables": {
1323:          "readiness_probe": {
1324:            "connection_port": true,
1325:            "timeout_secs": true
1326:          },
1327:          "create_spec": {
1328:            "name": true,
1329:            "resources": {
1330:              "tag_list": true,
1331:              "instance_type": true,
1332:              "block_device_map": {
1333:                "root_disk": {
1334:                  "size_gb": true
1335:                }
1336:              },
1337:              "key_name": true,
1338:              "instance_profile_name": true,
1339:              "availability_zone": true,
1340:              "vpc_id": true,
1341:              "region": true,
1342:              "security_group_list": true,
1343:              "subnet_id": true,
1344:              "instance_initiated_shutdown_behavior": true,
1345:              "image_id": true
1346:            }
1347:          }
1348:        },
1349:        "os_type": "Linux",
1350:        "type": "AWS_VM",
1351:        "readiness_probe": {
1352:          "connection_type": "SSH",
1353:          "retries": "5",
1354:          "disable_readiness_probe": false,
1355:          "timeout_secs": "300",
1356:          "address": "@@{public_ip_address}@@",
1357:          "connection_port": 22,
1358:          "login_credential_local_reference": {
1359:            "kind": "app_credential",
1360:            "name": "CENTOS",
1361:            "uuid": "570b76ad-49ff-41e1-80f1-0063be7a8279"
1362:          }
1363:        },
1364:        "uuid": "397d92af-2971-4f7b-9500-590e3e2c2821",
1365:        "description": ""
1366:      },
1367:      {
```

```
1368:       "variable_list": [],
1369:       "action_list": [],
1370:       "name": "APACHE_PHP_AWS",
1371:       "editables": {
1372:         "readiness_probe": {
1373:           "connection_port": true,
1374:           "timeout_secs": true
1375:         },
1376:         "create_spec": {
1377:           "name": true,
1378:           "resources": {
1379:             "tag_list": true,
1380:             "instance_type": true,
1381:             "block_device_map": {
1382:               "root_disk": {
1383:                 "size_gb": true
1384:               }
1385:             },
1386:             "key_name": true,
1387:             "instance_profile_name": true,
1388:             "availability_zone": true,
1389:             "vpc_id": true,
1390:             "region": true,
1391:             "security_group_list": true,
1392:             "subnet_id": true,
1393:             "instance_initiated_shutdown_behavior": true,
1394:             "image_id": true
1395:           }
1396:         }
1397:       },
1398:       "os_type": "Linux",
1399:       "type": "AWS_VM",
1400:       "readiness_probe": {
1401:         "connection_type": "SSH",
1402:         "retries": "5",
1403:         "disable_readiness_probe": false,
1404:         "timeout_secs": "300",
1405:         "address": "@@{public_ip_address}@@",
1406:         "connection_port": 22,
1407:         "login_credential_local_reference": {
1408:           "kind": "app_credential",
1409:           "name": "CENTOS",
1410:           "uuid": "570b76ad-49ff-41e1-80f1-0063be7a8279"
1411:         }
1412:       },
1413:       "uuid": "214314e5-4d92-44ac-b82d-add28710081e",
```

```
1414:        "description": ""
1415:      },
1416:      {
1417:        "variable_list": [],
1418:        "action_list": [],
1419:        "name": "HAPROXY_AWS",
1420:        "editables": {
1421:          "readiness_probe": {
1422:            "connection_port": true,
1423:            "timeout_secs": true
1424:          },
1425:          "create_spec": {
1426:            "name": true,
1427:            "resources": {
1428:              "tag_list": true,
1429:              "instance_type": true,
1430:              "block_device_map": {
1431:                "root_disk": {
1432:                  "size_gb": true
1433:                }
1434:              },
1435:              "key_name": true,
1436:              "instance_profile_name": true,
1437:              "availability_zone": true,
1438:              "vpc_id": true,
1439:              "region": true,
1440:              "security_group_list": true,
1441:              "subnet_id": true,
1442:              "instance_initiated_shutdown_behavior": true
1443:            }
1444:          }
1445:        },
1446:        "os_type": "Linux",
1447:        "type": "AWS_VM",
1448:        "readiness_probe": {
1449:          "connection_type": "SSH",
1450:          "retries": "5",
1451:          "disable_readiness_probe": false,
1452:          "timeout_secs": "300",
1453:          "address": "@@{public_ip_address}@@",
1454:          "connection_port": 22,
1455:          "login_credential_local_reference": {
1456:            "kind": "app_credential",
1457:            "name": "CENTOS",
1458:            "uuid": "570b76ad-49ff-41e1-80f1-0063be7a8279"
1459:          }
```

```
1460:           },
1461:           "uuid": "4777f91f-bd07-49eb-9466-d76db42189bb",
1462:           "description": ""
1463:         }
1464:       ]
1465:     },
1466:     "description": "Accessiblility:\n* Access PHP info from http://[HAPROXY_IP/NGINX_IP]/info.php"
1467:   }
1468: }
```

What is claimed is:

1. A method comprising:
maintaining, at a first time instance, a setup data which indicates that a user application is to be operative based on a first plurality of application components when the user application is hosted on a first cloud infrastructure, wherein the setup data further indicates that the user application is to be operative based on a second plurality of application components when hosted on a second cloud infrastructure;
receiving, after said first time instance, a first request to move the user application currently executing in a source cloud infrastructure to the first cloud infrastructure;
provisioning the first plurality of application components in the first cloud infrastructure in view of the setup data indicating the first plurality of application components for the first cloud infrastructure; and
executing the user application in the first cloud infrastructure based on the first plurality of application components.

2. The method of claim 1, the method further comprising:
receiving a second request to move the user application currently executing in the source cloud infrastructure to the second cloud infrastructure;
provisioning the second plurality of application components in the second cloud infrastructure in view of the setup data; and
executing the user application in the second cloud infrastructure based on the second plurality of application components.

3. The method of claim 2, wherein the first plurality of application components includes a first application component of a first component type, which is not present in the second plurality of application components.

4. The method of claim 2, wherein the first plurality of application components includes a first number of instances of a second component type, and the second plurality of application components includes a second number of instances of the second component type,
wherein the first number does not equal the second number.

5. The method of claim 1, wherein the setup data further indicates a first set of dependencies among the first plurality of application components, wherein each dependency indicates that a caller component uses a called component,
wherein the executing comprises initiating execution of each of the first plurality of application components according to a first order defined by the first set of dependencies, wherein the first order is set to initiate execution of each called component before the corresponding caller component indicated by the corresponding dependency.

6. The method of claim 5, wherein the setup data further comprises a first configuration data for the first plurality of application components, the method further comprising:
configuring, after the provisioning and prior to the executing, each of the first plurality of application components according to the first configuration data.

7. The method of claim 6, further comprising:
determining a first state data for the user application in the source cloud infrastructure; and
copying, prior to the executing, the first state data from the source cloud infrastructure to the first cloud infrastructure.

8. The method of claim 7, wherein the first plurality of application components comprises application services and infrastructure components,
wherein the infrastructure components include a first set of virtual machines (VMs) hosting the first plurality of application components in the first cloud infrastructure.

9. A non-transitory machine-readable medium storing one or more sequences of instructions, wherein execution of the one or more instructions by one or more processors contained in a digital processing system causes the digital processing system to perform the actions of:
maintaining, at a first time instance, a setup data which indicates that a user application is to be operative based on a first plurality of application components when the user application is hosted on a first cloud infrastructure, wherein the setup data further indicates that the user application is to be operative based on a second plurality of application components when hosted on a second cloud infrastructure;
receiving, after said first time instance, a first request to move the user application currently executing in a source cloud infrastructure to the first cloud infrastructure;
provisioning the first plurality of application components in the first cloud infrastructure in view of the setup data indicating the first plurality of application components for the first cloud infrastructure; and
executing the user application in the first cloud infrastructure based on the first plurality of application components.

10. The non-transitory machine-readable medium of claim 9, further comprising one or more instructions for:
receiving a second request to move the user application currently executing in the source cloud infrastructure to the second cloud infrastructure;
provisioning the second plurality of application components in the second cloud infrastructure in view of the setup data; and
executing the user application in the second cloud infrastructure based on the second plurality of application components.

11. The non-transitory machine-readable medium of claim 10, wherein the first plurality of application components includes a first application component of a first component type, which is not present in the second plurality of application components.

12. The non-transitory machine-readable medium of claim 10, wherein the first plurality of application components includes a first number of instances of a second component type, and the second plurality of application components includes a second number of instances of the second component type,
wherein the first number does not equal the second number.

13. The non-transitory machine-readable medium of claim 9, wherein the setup data further indicates a first set of dependencies among the first plurality of application components, wherein each dependency indicates that a caller component uses a called component,
wherein the executing comprises one or more instructions for initiating execution of each of the first plurality of application components according to a first order defined by the first set of dependencies, wherein the first order is set to initiate execution of each called component before the corresponding caller component indicated by the corresponding dependency.

14. The non-transitory machine-readable medium of claim 13, wherein the setup data further comprises a first configuration data for the first plurality of application components, further comprising one or more instructions for:
configuring, after the provisioning and prior to the executing, each of the first plurality of application components according to the first configuration data.

15. The non-transitory machine-readable medium of claim 14, further comprising one or more instructions for:
determining a first state data for the user application in the source cloud infrastructure; and
copying, prior to the executing, the first state data from the source cloud infrastructure to the first cloud infrastructure.

16. A digital processing system comprising:
a random access memory (RAM) to store instructions; and
one or more processors to retrieve and execute the instructions, wherein execution of the instructions causes the digital processing system to perform the actions of:
maintaining, at a first time instance, setup data indicating respective application profiles in corresponding cloud infrastructures for a user application, wherein each respective application profile indicates that the user application is to be operative based on a plurality of application components when hosted on the corresponding cloud infrastructure;
receiving, after said first time instance, a request to move the user application currently executing in a source cloud infrastructure to a target cloud infrastructure;
inspecting the setup data to identify a first application profile for the user application in the target cloud infrastructure; and
deploying the user application in the target cloud infrastructure according to the first application profile.

17. The digital processing system of claim 16, wherein the first application profile indicates that the user application is to be operative based on a first plurality of application components when hosted on the target cloud infrastructure, wherein for the deploying, the digital processing system performs the actions of:
provisioning the first plurality of application components in the target cloud infrastructure; and
executing the user application in the target cloud infrastructure based on the first plurality of application components.

18. The digital processing system of claim 17, wherein the first application profile further indicates a set of dependencies among the first plurality of application components, wherein each dependency indicates that a caller component uses a called component,
wherein for the executing, the digital processing system performs the actions of initiating execution of each of the first plurality of application components according to an order defined by the set of dependencies, wherein the order is set to initiate execution of each called component before the corresponding caller component indicated by the corresponding dependency.

19. The non-transitory machine-readable medium of claim 18, wherein the first application profile further comprises a configuration data for the first plurality of application components, further comprising one or more instructions for:
configuring, after the provisioning and prior to the executing, each of the first plurality of application components according to the configuration data.

20. The non-transitory machine-readable medium of claim 19, further comprising one or more instructions for:
determining a state data for the user application in the source cloud infrastructure; and
copying, prior to the executing, the state data from the source cloud infrastructure to the target cloud infrastructure.

* * * * *